US012424778B2

(12) United States Patent
Mincey

(10) Patent No.: US 12,424,778 B2
(45) Date of Patent: *Sep. 23, 2025

(54) SOLDERLESS WIRE-TO-BOARD SINGLE PAIR ETHERNET CONNECTION SYSTEM

(71) Applicant: KYOCERA AVX Components Corporation, Fountain Inn, SC (US)

(72) Inventor: Jackie Mincey, Fountain Inn, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,850

(22) Filed: Feb. 8, 2024

(65) Prior Publication Data

US 2024/0186735 A1 Jun. 6, 2024

Related U.S. Application Data

(63) Continuation of application No. 17/483,348, filed on Sep. 23, 2021, now Pat. No. 11,929,568.

(Continued)

(51) Int. Cl.

*H01R 12/75* (2011.01)
*H01R 4/2433* (2018.01)

(Continued)

(52) U.S. Cl.

CPC ........... *H01R 12/75* (2013.01); *H01R 4/2433* (2013.01); *H01R 12/58* (2013.01); *H01R 12/675* (2013.01);

(Continued)

(58) Field of Classification Search

CPC ...... H01R 12/75; H01R 4/2433; H01R 12/58; H01R 12/675; H01R 12/7023;

(Continued)

(56) References Cited

U.S. PATENT DOCUMENTS

| | | | |
|---|---|---|---|
| 6,178,096 | B1 | 1/2001 | Sim et al. |
| 6,547,593 | B1 | 4/2003 | Beckous |

(Continued)

FOREIGN PATENT DOCUMENTS

| | | | |
|---|---|---|---|
| CN | 107834324 | A | 3/2018 |
| JP | 5114275 | B2 | 1/2013 |

(Continued)

OTHER PUBLICATIONS

International Search Report and Written Opinion in PCT/US2021/051759 dated Jan. 10, 2022 (9 pages).

(Continued)

*Primary Examiner* — Travis S Chambers
(74) *Attorney, Agent, or Firm* — Foley & Lardner LLP

(57) ABSTRACT

This disclosure provides a method and apparatus for a single pair Ethernet (SPE) wire-to-board connector. The SPE connector may include a female connector portion and a male connector portion. The female connector portion may include a first electrical contact having a first press-fit pin and a first female portion, a second electrical contact having a second press-fit pin and a second female portion, and a first outer shield, the first outer shield mechanically secured to the first insulative housing. The first and second electrical contacts may be positioned partially within the first insulative housing. The male connector portion includes a third electrical contact comprising a first insulation displacement contact (IDC) portion and a first male portion, a fourth electrical contact comprising a second IDC portion and a second male portion, and a second outer shield, the second outer shield mechanically secured to a second insulative housing.

21 Claims, 26 Drawing Sheets

Related U.S. Application Data

(60) Provisional application No. 63/082,724, filed on Sep. 24, 2020.

(51) Int. Cl.

| | |
|---|---|
| ***H01R 12/58*** | (2011.01) |
| ***H01R 12/67*** | (2011.01) |
| ***H01R 12/70*** | (2011.01) |
| ***H01R 13/627*** | (2006.01) |
| ***H01R 13/6582*** | (2011.01) |
| *H01R 12/57* | (2011.01) |

(52) U.S. Cl.
CPC ..... *H01R 12/7023* (2013.01); *H01R 13/6275* (2013.01); *H01R 13/6582* (2013.01); *H01R 12/57* (2013.01)

(58) Field of Classification Search
CPC H01R 13/6275; H01R 13/6582; H01R 12/57; H01R 13/6272; H01R 13/6594; H01R 9/031
See application file for complete search history.

(56) References Cited

U.S. PATENT DOCUMENTS

| | | | | |
|---|---|---|---|---|
| 10,164,383 | B2 * | 12/2018 | Feng | H01R 24/20 |
| 11,031,719 | B2 * | 6/2021 | Somanathapura Ramanna | H01R 13/28 |
| 11,469,552 | B2 | 10/2022 | Kim et al. | |
| 11,894,637 | B2 * | 2/2024 | Pepe | H01R 13/5045 |
| 11,929,568 | B2 * | 3/2024 | Mincey | H01R 13/6275 |
| 2003/0022547 | A1 | 1/2003 | Sukagawa | |
| 2009/0093166 | A1 | 4/2009 | Fogg et al. | |
| 2011/0255827 | A1 | 10/2011 | Schmidt et al. | |
| 2015/0214668 | A1 * | 7/2015 | Qi | H01R 13/6477 439/676 |
| 2018/0175560 | A1 * | 6/2018 | Zhang | H01R 12/71 |
| 2018/0183183 | A1 | 6/2018 | Kelly et al. | |
| 2018/0323550 | A1 | 11/2018 | Brennan et al. | |
| 2019/0214746 | A1 | 7/2019 | Zhang et al. | |
| 2020/0144735 | A1 | 5/2020 | Hata et al. | |
| 2020/0153174 | A1 | 5/2020 | Curtis et al. | |
| 2020/0388943 | A1 | 12/2020 | He | |
| 2021/0151905 | A1 * | 5/2021 | Novak | H01R 4/242 |
| 2021/0249797 | A1 | 8/2021 | Lybrand | |

FOREIGN PATENT DOCUMENTS

| | | | |
|---|---|---|---|
| WO | WO-2017/082580 | A1 | 5/2017 |
| WO | WO-2019/165466 | A1 | 8/2019 |
| WO | WO-2021/067274 | A1 | 4/2021 |

OTHER PUBLICATIONS

International Search Report and Written Opinion in PCT/US2022/044428 dated Mar. 3, 2023 (11 pages).

* cited by examiner

SOLDERLESS WIRE-TO-BOARD SINGLE PAIR ETHERNET CONNECTION SYSTEM

CROSS-REFERENCE TO RELATED APPLICATIONS

The present application is a continuation of U.S. patent application Ser. No. 17/483,348, filed Sep. 21, 2021, now U.S. Pat. No. 11,929,568, which claims priority to and the benefit of U.S. Provisional App. No. 63/082,724, filed Sep. 24, 2020, the entireties of which are hereby incorporated by reference in their entireties.

FIELD

The present application relates generally to the field of electrical connectors, and more particularly to a solderless single pair Ethernet (SPE) connection system.

BACKGROUND

The following description is provided to assist the understanding of the reader. None of the information provided or references cited are admitted to be prior art.

Various types of connectors are used for forming connections between a wire and any manner of electronic or electrical component. For example, an electrical connection may be formed between a printed circuit board (PCB) of a controller and a sensor assembly. Traditionally, the electrical connection between a wire and (PCB) is formed by soldering the core of the wire onto an electrical pad or of the PCB. The wire may similarly be soldered to an electrical pad of the sensor assembly to form the electrical connection between the sensor assembly and the controller. This process can be tedious, inefficient, and undesirable and may result in a high scrap rate, which may be expensive. Moreover, once a solder has been made, the connection is not reparable, and a replacement would require new components. This is undesirable in applications where components cannot be easily reachable (e.g., a connection to a vehicle's PCB). Thus, a quick, efficient, and reliable device that can be used to connect two or more devices together for communication and/or power sharing therebetween is desirable.

SUMMARY

The systems, methods, and devices of this disclosure each have several innovative aspects, no single one of which is solely responsible for the desirable attributes disclosed herein.

An solderless single pair Ethernet (SPE) connector is disclosed. In one implementation, the SPE connector includes a female connector portion and a male connector portion. The female connector portion includes a first electrical contact comprising a first press-fit pin and a first female portion, the first electrical contact positioned partially within a first insulative housing, a second electrical contact comprising a second press-fit pin and a second female portion, the second electrical contact positioned partially within the first insulative housing, and a first outer shield, the first outer shield mechanically secured to the first insulative housing. The male connector portion includes a third electrical contact comprising a first insulation displacement contact (IDC) portion and a first male portion, a fourth electrical contact comprising a second IDC portion and a second male portion, and a second outer shield, the second outer shield mechanically secured to a second insulative housing, the second insulative housing positioned at least partially around the third electrical contact and the fourth electrical contact.

In another implementation, a SPE connector may include a female connector portion and a male connector portion. The female connector portion includes a first contact having a first press-fit pin, a second contact comprising a second press-fit pin, and a first insulative housing having a first contact retention recess and a second contact retention recess. The first contact may be positioned at least partially within the first contact retention recess, and the second contact may similarly be positioned at least partially within the second contact retention recess. The first press-fit pin and the second press-fit pin extend from the first insulative housing and are configured to electrically and mechanically connect to respective openings of a printed circuit board. The male connector portion may include a first insulation displacement contact (IDC) and a second IDC, the first IDC configured to connect to a first wire of an SPE cable, and the second IDC configured to connect to a second wire of the SPE cable.

Another implementation relates to a method of use. The method may include aligning a first side of a female connector adjacent to a printed circuit board, compressing press-fit compliant pins of the female connector into respective conductive holes of the printed circuit board, aligning a first wire of a single pair Ethernet (SPE) wire adjacent to a first IDC contact of a male connector, aligning a second wire of the single pair Ethernet (SPE) wire adjacent to a second IDC contact of the male connector, compressing an insulative housing onto the first wire and the second wire such that a first electrical connection is made between the first wire and the first wire and a second electrical connection is made between the second wire and the second IDC, and adjoining the male connector with the female connector such that an electrical connection is formed between a first conductive hole of the printed circuit board and the first wire and an electrical connection is formed between a second conductive hole of the printed circuit board and the second wire.

The electrical connector is not limited by its number of wire openings or other components. Particular embodiments of electrical connectors are described in greater detail below by reference to the examples illustrated in the various drawings.

DETAILED DESCRIPTION

Figure 1B:
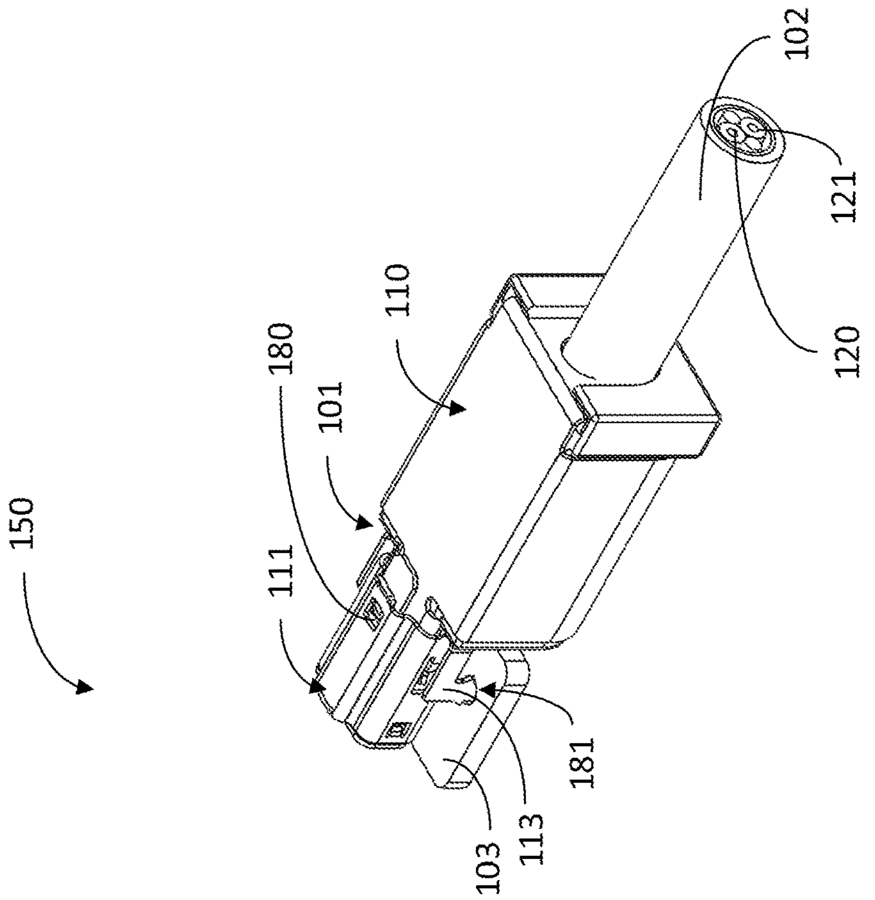
FIGS. 1A and 1B are isometric views of a single pair Ethernet (SPE) connector in accordance with an illustrative embodiment.

Reference will now be made to various embodiments, one or more examples of which are illustrated in the figures. The embodiments are provided by way of explanation of the invention and are not meant as a limitation of the invention. For example, features illustrated or described as part of one embodiment may be used with another embodiment to yield still a further embodiment. It is intended that the present application encompass these and other modifications and variations as come within the scope and spirit of the invention.

Disclosed herein is a single pair Ethernet (SPE) connector. The SPE connector can be used with a variety of corresponding connectors and electrical components. For example, the SPE connector may be used with a printed circuit board (PCB) and/or an electrical plug. In an embodiment, the SPE connector includes a male connector portion and a female connector portion. The female connector is configured to connect to a PCB via an electrical connection between press-fit ends of respective electrical contacts and the male connector is configured to connect to the two wires of a SPE cable via an insulation displacement end of respective electrical contacts. The female connector and the male connector are configured to mate together such that a first electrical connection between a first contact of the PCB and a first wire of the SPE cable is formed and a second electrical connection between a second contact of the PCB and a second wire of the SPE cable is formed.

It is to be appreciated that in other embodiments, similar techniques and structures may be used to form connections between a PCB and multiple SPE wires. For example, a main controller in a manufacturing environment may need to connect with multiple devices or sensors (e.g., robotic arms, cameras, temperature sensors, drives, etc.) to share power and/or communicate data. Accordingly, in such an environment, an SPE connector that is configured to connect 2, 3, 4, 5, or more wires to respective contacts on the PCB of the main controller may be implemented. That is, in some embodiments, the male connector and the female connector may include additional contacts to those discussed herein that allow for efficient, reliable, and removable electrical connections between multiple SPE cables and a respective PCB.

The unique design of the male connector and the female connector increases the versatility of the SPE connector. Specifically, the press-fit pins of the female connector allow for a secure and reliable connection to a respective PCB via through holes on the PCB without the use of solder or other tedious connection methods. Additionally, the male connector allows for an easy disconnection and reconnection of SPE cables to the female end and the IDC contact portions of the male connector allow for a user to efficiently and reliably make connections between the male connector and wires of the SPE (or other) cable. Accordingly, this versatility allows for a wide potential of options of connecting, reconnecting, replacing, and/or adding connections between devices. For example, traditionally, a user must manually handle each wire and solder the wire to a contact pad of the PCB, the PCB must be pre-fabricated to accept a particular plug or socket, and/or the SPE cable must be stripped and connected and secured to a corresponding plug or socket. However, the design for this SPE connector allows for an SPE cable to be connected and/or disconnected to a PCB board efficiently and reliably, which allows for versatility in, for example, a multifaceted application such as an industrial application where updates, changes, and inclusion of devices within a system are ever changing. In addition, the design of the SPE ensures a reliable electrical connection between PCB and wires (e.g., via the press-fit pins and mechanical interlocks) that are resistant to thermal changes and/or vibrations that could cause a soldered electrical connection to crack, rust, and/or break, which is advantageous in, for example, particular applications such as in vehicles where there are fulgurations in temperature and mechanical vibrations are present.

Moreover, and in particular, to communications connections such as Ethernet, the SPE connector allows for a single pair of conductive wires to transmit data while simultaneously delivering power between devices. The shielding components of the SPE connector ensure data communication integrity by reducing potential electromagnetic interference and the electrical connections via the press-fit pins ensure that heat due to power transmission does not affect the integrity of the electrical connections, which also enhances the durability of a system implementing the SPE connector.

Various embodiments of an SPE connector and various corresponding electrical components are illustrated throughout FIGS. 1 through 13. The SPE connector disclosed in these figures is configured to assist in the electrical and mechanical connection of multiple wires to a corresponding electrical component. In an embodiment, the SPE connector may have additional electrical contacts. It should be appreciated that the SPE connectors disclosed herein are not limited by a maximum number of wire positions, corresponding electrical contacts, press-fit pins, or types of connections that couple each component together.

Figure 1A:
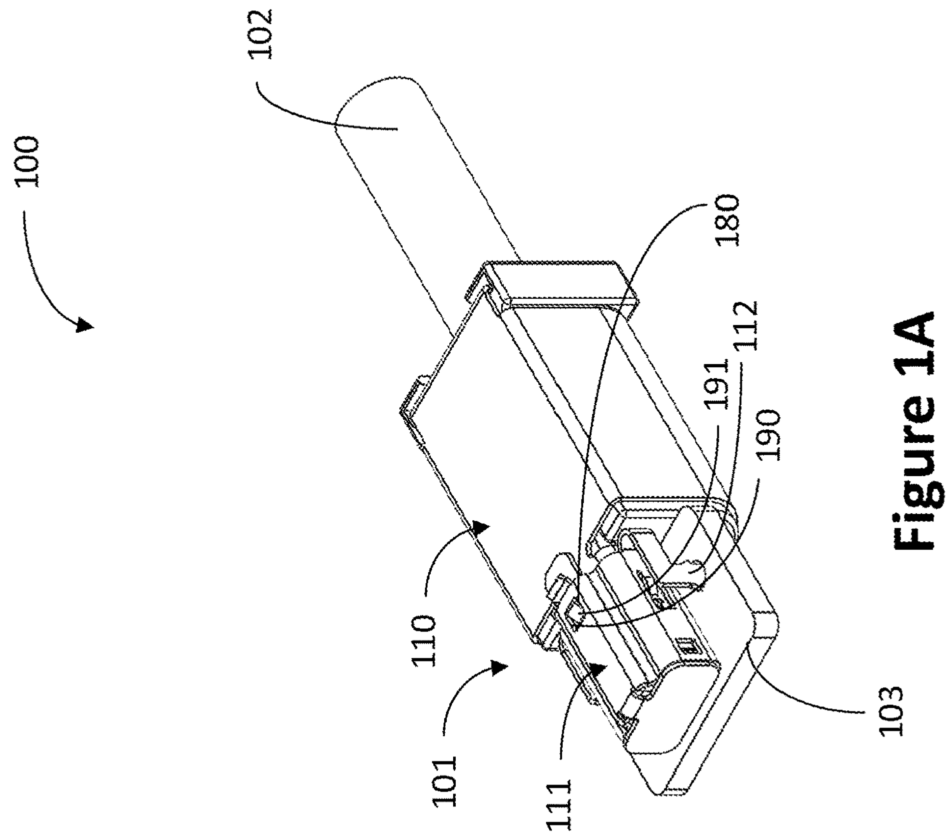

FIGS. 1A and 1B are isometric views 100 and 150 of a single pair Ethernet (SPE) connector 101 connected to a SPE cable 102 and a printed circuit board 103 in accordance with an illustrative embodiment. The SPE connector 101 includes a male connector 110 and a female connector 111 mated together such that a first conductor 120 of the SPE cable 102 is electrically connected to a first contact pad on the PCB 103 and a second conductor 121 of the SPE cable 102 is electrically connected to a second contact pad on the PCB 103. In particular, the first conductor 120 is mechanically and electrically connected to a first contact of the male connector 110, the first contact of the male connector 110 is electrically and mechanically connected to a first contact of the female connector 111, and the first contact of the female connector 111 is mechanically and electrically connected to the first contact pad on the PCB 103. Similarly, the second conductor 121 is mechanically and electrically connected to a second contact of the male connector 110, the second contact of the male connector 110 is electrically and mechanically connected to a second contact of the female connector 111, and the second contact of the female connector 111 is electrically and mechanically connected to the second contact pad of the PCB 103. Examples of the electrical and mechanical connections of each of the components are discussed in additional detail below.

In some embodiments, the male connector 110 and the female connector 111 may be mechanically secured together via a latching mechanism 180. The latching mechanism 180 includes an opening 190 on a shielding of the female connector 111 and an interlock pin 191 of the male connector 110 such that the interlock pin 191 the interlock pin 191 is configured to adjoin with the opening on the shield and create a secure mechanical connection between the male connector 110 and the female connector 111 (e.g., via a frictional force). In some embodiments, the SPE connector 101 may include multiple latching mechanisms that are configured to mechanically secure the male connector 110 and the female connector 111 together. The latching mechanism 180 ensures that the electrical connection between the PCB 103 and the SPE cable 102 is reliable in variable conditions.

The female connector 111 is mechanically secured to the PCB 103 via a second latching mechanism 181. The second latching mechanism 181 includes a first pin 112 and a second pin 113 on the female connector 111 configured to be deployed into a first opening and a second opening of the PCB 103, respectively, to mechanically secure the female connector 111 to the PCB 103. In other embodiments, the latching mechanism 180 and the second latching mechanism 181 may have alternative or additional components that allow for the respective mechanical connections. The latching mechanism 180 and the second latching mechanism 181 are discussed in additional detail below.

Figure 1D:
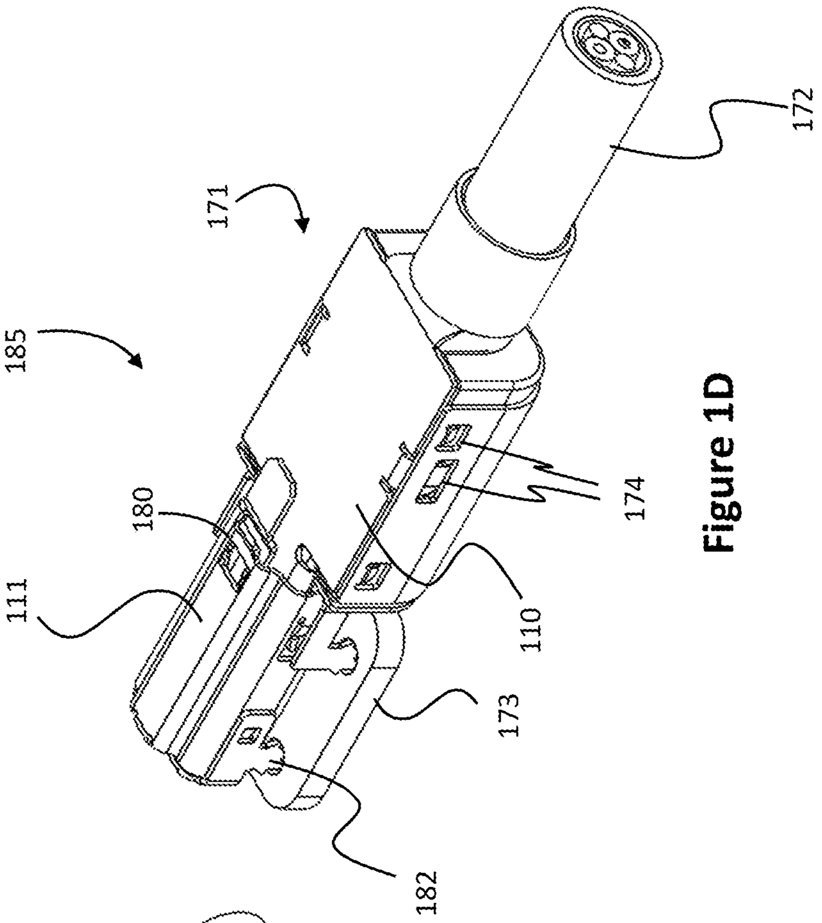
FIGS. 1C and 1D are isometric views of a single pair Ethernet (SPE) connector in accordance with another illustrative embodiment.
Figure 1C:
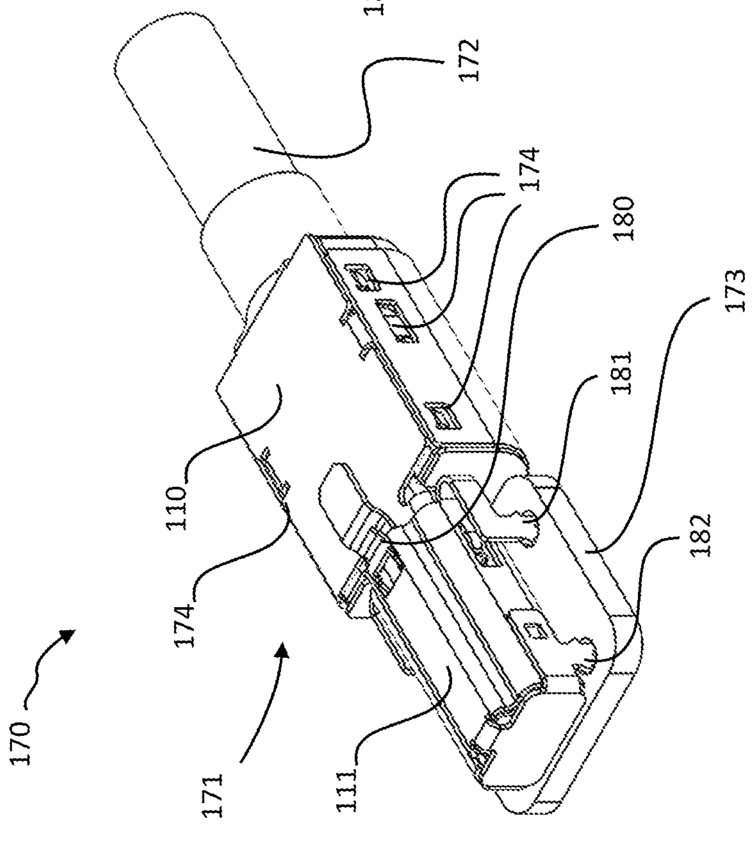

FIGS. 1C and 1D are isometric views 170 and 185 of a single pair Ethernet (SPE) connector 171 connected to a SPE cable 172 and a printed circuit board 173 in accordance with another illustrative embodiment. The SPE connector 101 includes a male connector 110 and a female connector 111 mated together such that a first conductor of the SPE cable 172 is electrically connected to a first contact pad on the PCB 173 and a second conductor of the SPE cable 172 is electrically connected to a second contact pad on the PCB 173. Examples of the electrical and mechanical connections of each of the components are discussed in additional detail below. The SPE connector 171 includes various similar features as the SPE connector 101 as will be evident from the figures but also includes additional or different features as discussed below.

In some embodiments, the male connector 110 and the female connector 111 of SPE connector 171 are mechanically secured together via latching mechanism 180. Latching mechanism 180 of FIGS. 1C and 1D may have a different configuration form latching mechanism 180 of FIGS. 1A and 1B as discussed in further detail with respect to FIG. 7B. The female connector 111 is mechanically secured to the PCB 173 via second latching mechanism 181 and a third latching mechanism 182. The second latching mechanism 181 includes a first pin and a second pin on the female connector 111 configured to be deployed into a first opening and a second opening of the PCB 173, respectively, and the third latching mechanism 182 similarly including first and second pins configured to deployed into third and fourth openings of the PCB 173 to mechanically secure the female connector 111 to the PCB 173. In other embodiments, the latching mechanisms 180, 181, and 182 may have alternative or additional components that allow for the respective mechanical connections. The latching mechanisms 180, 181, and 182 are discussed in additional detail below.

As further illustrated in FIGS. 1C and 1D, the male connector 110 includes a multi piece shield that is connected utilizing a plurality of retention features 174. This configuration is further discussed below with respect to FIGS. 7B, 13C, 13D and elsewhere throughout the specification.

Figure 2A:
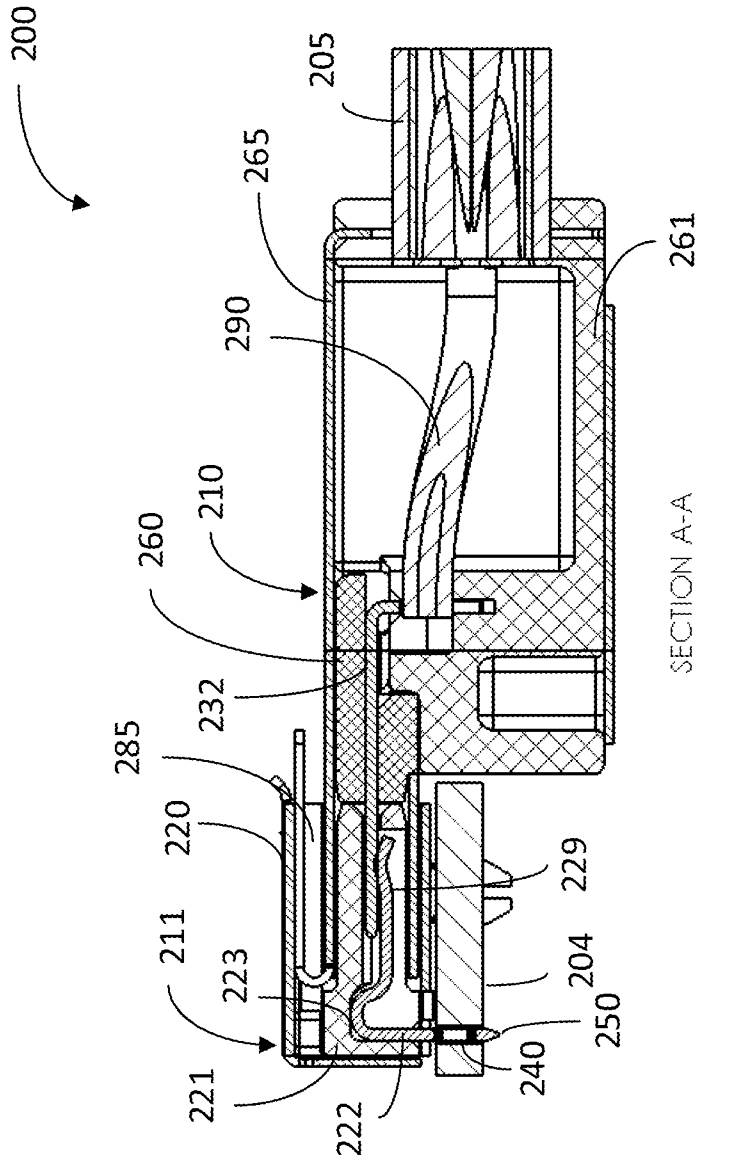
FIG. 2A is a cross-sectional view of the SPE connector in accordance with an illustrative embodiment.

FIG. 2A depicts a cross-sectional view of a SPE connector 200 in accordance with an illustrative embodiment. The SPE connector 200 includes a male connector 210 and a female connector 211. The male connector 210 and female connector 211 are similar to the male and female connectors described in reference to FIGS. 1A-1B. The cross-sectional view of the SPE connector 200 depicts the electrical connection between a conductive element of a first wire 290 of a SPE cable 205 and a through-hole having the electrical pad or conductive plating 240 on a PCB 204.

The female connector 211 includes an outer shield 220, an insulative housing 221, first contact 222, and a second contact. The outer shield 220 is configured to block or attenuate electromagnetic radiation to reduce interference with the data signals sent via the first contact 222 and the second contact. That is, the outer shield 220 is configured to sufficiently encapsulate the insulative housing 221 in order to provide structural protection to the insulative housing 221 and shield the contacts seated within the insulative housing 221 from electromagnetic radiation. The outer shield 220 may not cover one side of the insulative housing 221 that is structured to receive a corresponding side of the male connector 210. The outer shield 220 may be made of copper, nickel, an alloy thereof or any conductive material that is configured to attenuate or block electromagnetic radiation. The thickness of the shield may be selected based on the application and materials used.

The insulative housing 221 includes recesses that house the first contact 222 and the second contact. For example, the recesses are configured to provide support to a respective contact. The recesses have a depth that allows for the respective contact to be seated therein. A gap 285 between the insulative housing 221 and the outer shield 220 allows for a corresponding interlock pin of the male connector 210 to be placed therein and create a secure mechanical connection therebetween. In an embodiment, the recesses include a saddle seat portion 223 that is configured to seat a "U" shaped portion of the respective contact (e.g., first contact 222). The seating of the first contact 222 the saddle seat portion 223 restricts the first contact 222 from lateral movements and ensures that a respective press-fit pin can be mated with the through-hole 240 on the PCB 204 reliably and efficiently.

The first contact 222 includes a press-fit pin 250 on a first end (e.g., a press-fit portion) and is shaped such that a second end 229 (e.g., a female portion) creates a pinch-point for a pin or blade of a respective first contact 232 of the male connector 210 when placed within the insulative housing 221. The frictional force with the pin or blade of the respective first contact 232 forms a mechanical and electrical connection is formed therebetween. The press-fit pin 250 is configured to create a frictional force between a through-hole having an electrical pad or conductive plating 240 of a PCB 204. The frictional force may be created via an elastic force created when the press-fit pin 250 is place within the through-hole 240. The press-fit pin 250 is structured such that when the press-fit pin 250 is inserted into a respective through-hole, deformation occurs between the press-fit pin 250 and the through-hole to create a mechanical and electrical connection therebetween. Additional features of the first contact 222 of the female connector 211 are described below.

The male connector 210 includes the first contact 232 and a second contact. The first contact 232 of the male connector 210 includes an insulation displacement contact (IDC) at a first end and the pin or blade at second end. The IDC is configured to displace the insulation of a corresponding first wire 290 of a SPE cable 205 in order to create a mechanical and electrical connection therebetween. The male connector 210 also includes a first insulative housing 260 and a second insulative housing 261. The first insulative housing 260 is configured to provide support to the first contact 232 and the second contact of the male connector 210. The second insulative housing 261 is structured such that, for example, the first wire 290 can be adjoined with the IDC when the second insulative housing 261 is pressed over or onto the first contact and the second contact of the male connector 210.

The male connector 210 also includes an outer shield 265. The outer shield 265 of the male connector 210 encapsulates at least a portion of the first and second insulative housing 260 and 261 and includes a first opening that allows the first contact 232 and the second contact of the male connector 210 to be adjoined with the female connector 211 and a second opening that allows the SPE cable 205 to be adjoined with the contacts of the male connector 210. The outer shield 265 of the male connector 210 may be formed or made form a similar material to the outer shield 220 of the female connector 211 and provide radio frequency (RF) shielding to the electrical components within the outer shield 265. In an embodiment, the outer shield 265 is mechanically secured to the first and second insulative housings 260 and 261, for example, by virtue of the partial encapsulation thereof.

Figure 2B:
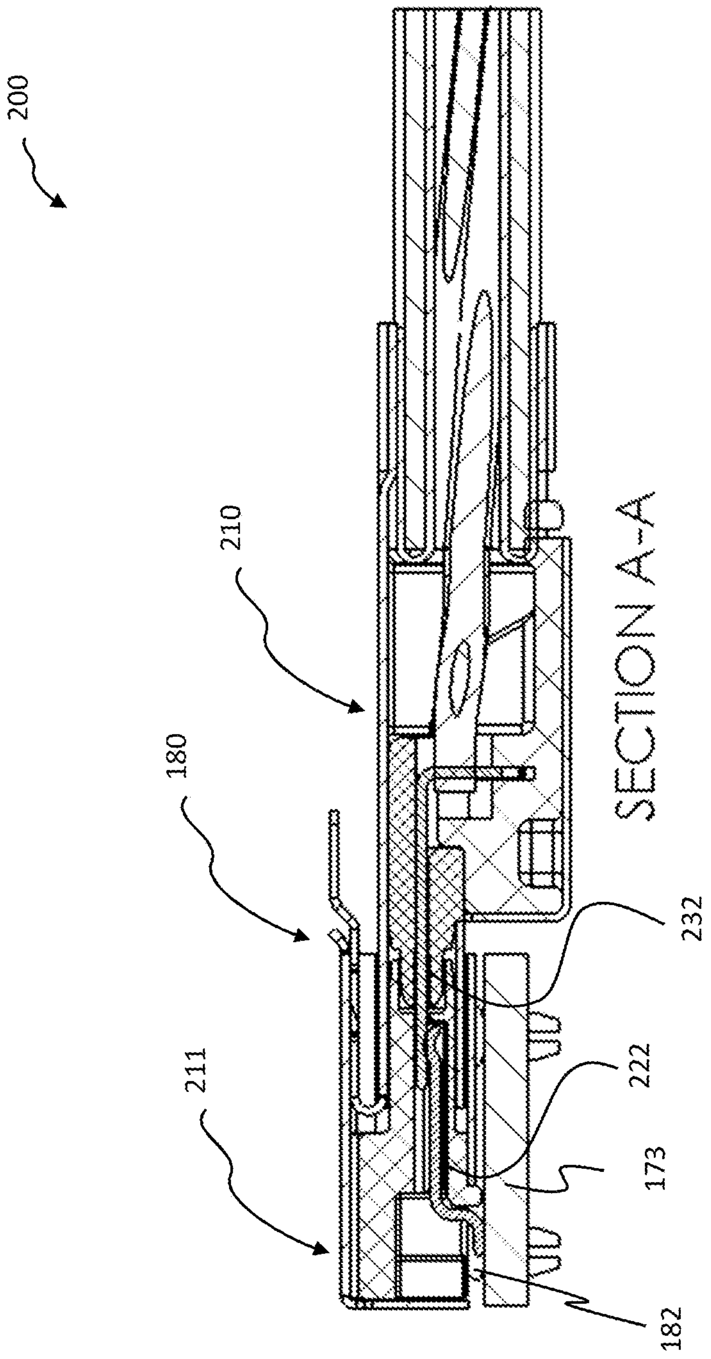
FIG. 2B is a cross-sectional view of the SPE connector in accordance with another illustrative embodiment.

FIG. 2B depicts a cross-sectional view of a SPE connector 200 in accordance with another illustrative embodiment. The SPE connector 200 of FIG. 2B includes a male connector 210 and a female connector 211. The male connector 210 and female connector 211 are similar to the male and female connectors described in reference to FIGS. 1C-1D. The SPE connector 200 of FIG. 2B includes various similar features as the SPE connector 200 of FIG. 2A as will be evident from the figures but also includes additional or different features as discussed below. The cross-sectional view of the SPE connector 200 depicts the electrical connection between a conductive element of a first wire of a SPE cable and a contact pad on a PCB 173.

Similar to that of FIG. 2A, the female connector 211 of FIG. 2B includes an outer shield, an insulative housing, a first contact 222, and a second contact (not visible in FIG. 2B). The outer shield is configured to block or attenuate electromagnetic radiation to reduce interference with the data signals sent via the first contact 222 and the second contact. The insulative housing includes recesses that house the first contact 222 and the second contact. The first contact 222 includes a first end that is mechanically and electrically coupled to a conductive pad on the PCB 173 and a second end that is mechanically and electrically coupled to a first contact 232 of the male connector 210.

Figure 3A:
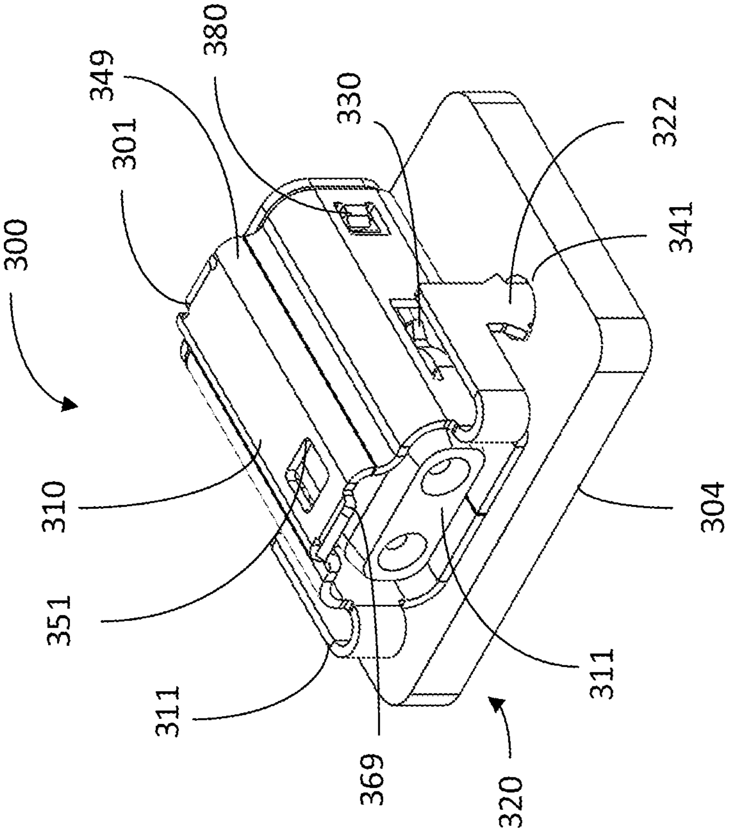
FIGS. 3A-3D are isometric views of a female connector of the SPE connector in accordance with illustrative embodiments.
Figure 3B:
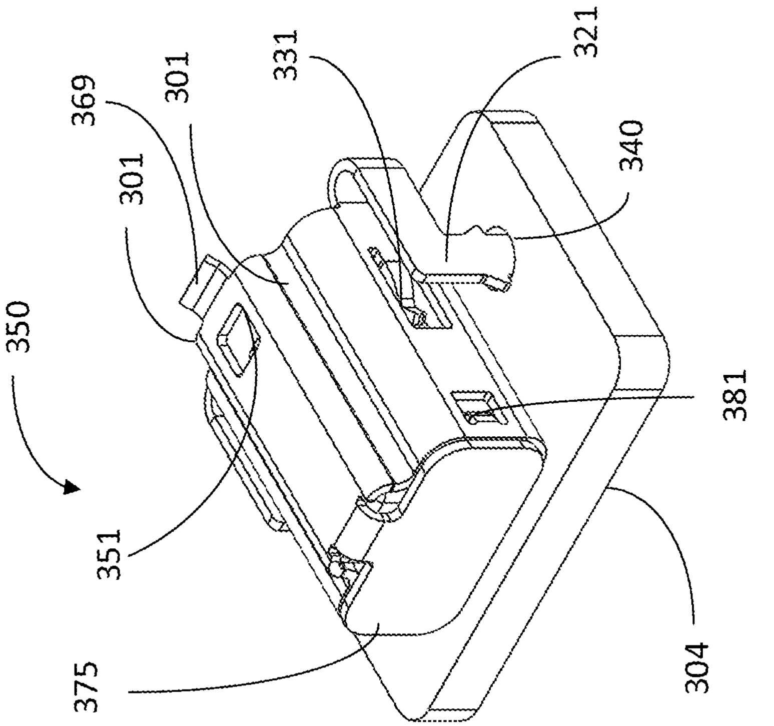

FIGS. 3A and 3B depict isometric views 300 and 350 of a female connector 301 of the SPE connector in accordance with illustrative embodiments. The female connector 301 includes an outer shield 310 and an insulative housing 311. The outer shield 310 mostly encapsulates the insulative housing 311 except for along a first side 320 that is configured to receive a portion of a respective male connector. The outer shield 310 includes a first latching pin 321 and a second latching pin 322 that are structured to mechanically secure the outer shield 310 to a respective PCB 304 via latching or mechanically bonding with a first opening 340 and a second opening 341 of the PCB 304. The first latching pin 321 and the second latching pin 322 extend along respective planes that are parallel to a plane that the press-fit pins extend in. In this way, the female connector 301 can be compressed into a PCB and mechanically secured thereto in an efficient manner.

The outer shield 310 also includes a first tongue 330 and a second tongue 331 positioned on opposite sides of the outer shield 310. The first tongue 330 and the second tongue 331 are structured to provide tactile support to a user. For example, the first and second tongues 330 and 331 may allow for a user to grab the outer shield 310 via placing one or more fingers between the respective pins 321 and 322 in order to compress the female connector 301 and press-fit pins together with the PCB 304. Moreover, the outer shield 310 includes a first locking pin 380 and a second locking pin 381. The first locking pin 380 and the second locking pin 381 are structured to be seated within corresponding notches of the insulative housing 311. In this way, the first and second locking pins 380 and 381 may secure the insulative housing 311 in a manner that prevents movement of the insulative housing 311 along a first axis (e.g., longitudinal axis) relative to the outer shield 310. Further, the snug fit between a base portion of the insulative housing 311 and the outer shield 310 prevents the movement of the insulative housing 311 along a second axis (e.g., vertical axis) and a third axis (e.g., lateral axis) such that a corresponding male connector can be adjoined to the female connector 301 reliably and efficiently.

In some embodiments, the outer shield 310 also includes an opening 351 on a third side that allows for a interlock pin of a respective male connector to mechanically secure the male connector with the female connector 301. The third side may also include an indented ridge 349 that runs the length of the female connector 301 that is structured to act as a groove in order assist in the assembly of the insulative housing 311 and the outer shield 310 and provide support to the insulative housing 311. Moreover, the indented ridge 349 acts as an inadvertent error prevention feature to ensure the housing cannot be inserted into the shield in improper configuration (e.g., upside down) and that a respective male connector is inserted correctly. The indented ridge 349 may also include a guide rail 369 that extends angularly away from the edge of the indented ridge 349 on the third side from the outer shield 310. The rail 369 may ensure that the interlock pin of the respective male connector is guided within a cage structure (e.g., under the indented ridge 349) created by the outer shield 310. The outer shield 310 also includes an end portion 375 that is discussed in additional detail in reference to FIGS. 6A and 6B.

Figure 3D:
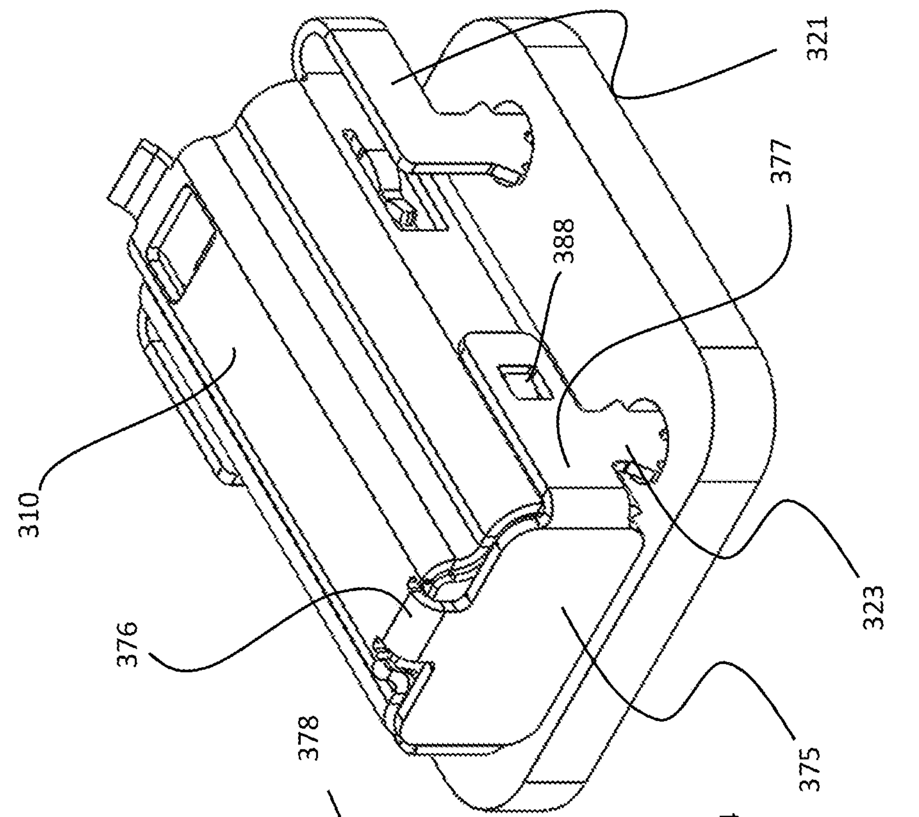
Figure 3C:
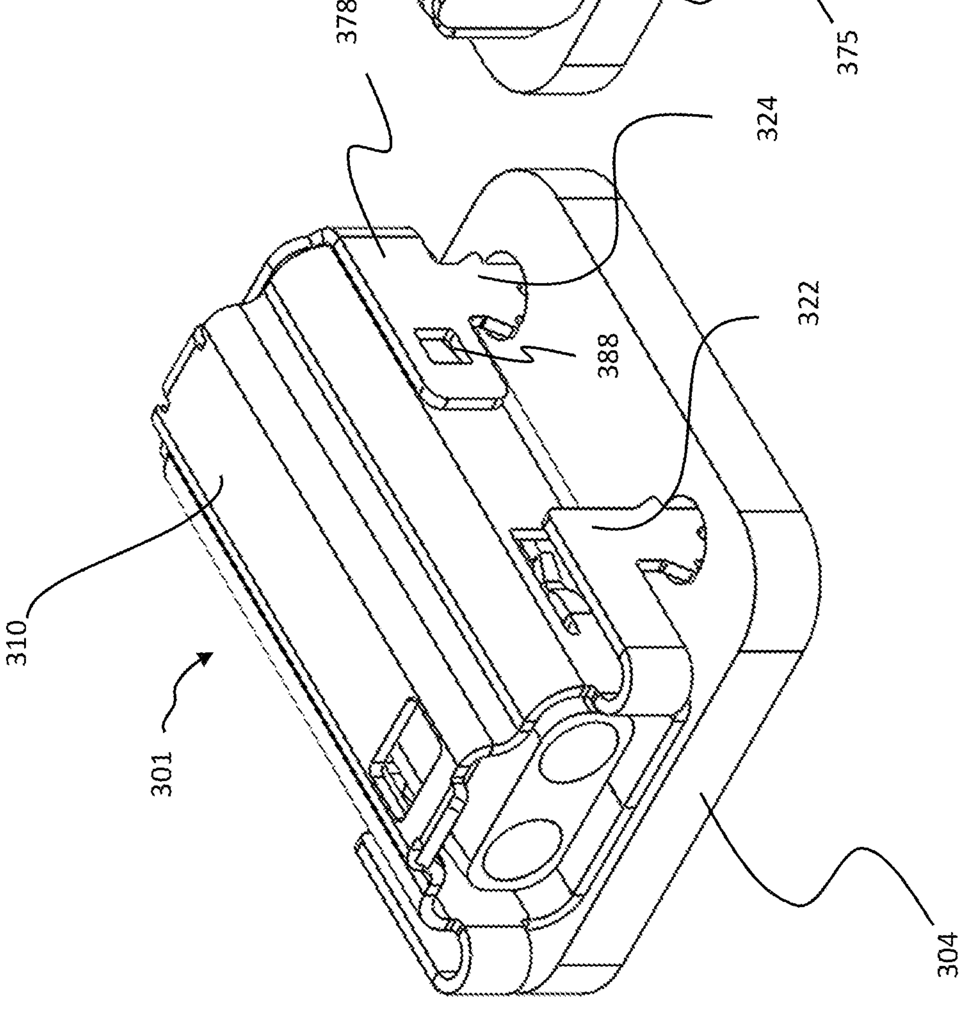

FIGS. 3C and 3D depict isometric views of a female connector 301 of the SPE connector in accordance with another illustrative embodiment. The female connector 301 of FIGS. 3C and 3D includes various similar features as the female connector 301 of FIGS. 3A and 3B as will be evident from the figures but also includes additional or different features as discussed below. The female connector 301 includes an outer shield 310 that mostly surrounds an insulative housing except for along a first side that is configured to receive a portion of a respective male connector. The outer shield 310 includes a first latching pin 321, a second latching pin 322, a third latching pin 323, and a fourth latching pin 324 that are each structured to mechanically secure the outer shield 310 to a respective PCB 304 via latching or mechanically bonding with a corresponding opening of the PCB 304.

The outer shield 310 of FIGS. 3C and 3D further includes an end portion 375 that is connected to a main body portion of the outer shield 310 by a transition portion 376. In an embodiment, the transition portion 376 comprises a portion smaller in width than the end portion 375 that is bent or folded to position the end portion 375 perpendicular to the respective surfaces of the main body portion of the outer shield 310. Extension portions 377 and 378 extend from the end portion 375 and are bent around the sides of the main body portion of the outer shield 310. The third latching pin 323 and the fourth latching pin 324 extend from a lowest surface (e.g., a surface nearest the PCB 304) of the extension portions 377 and 378, respectively. Each of the extension portions 377 and 378 includes an opening 388 that is configured to engage a retention clip on the side of the main body portion of the outer shield 310 to hold the end portion 375 in place. The combination of the additional latching pins 323 and 324 as well as the opening and retention clips associated with extension portions 377 and 378 provide increased stability, and rigidity for both the outer shield 310 as well as the connection of the female connector 301 to the PCB 304.

Figure 4A:
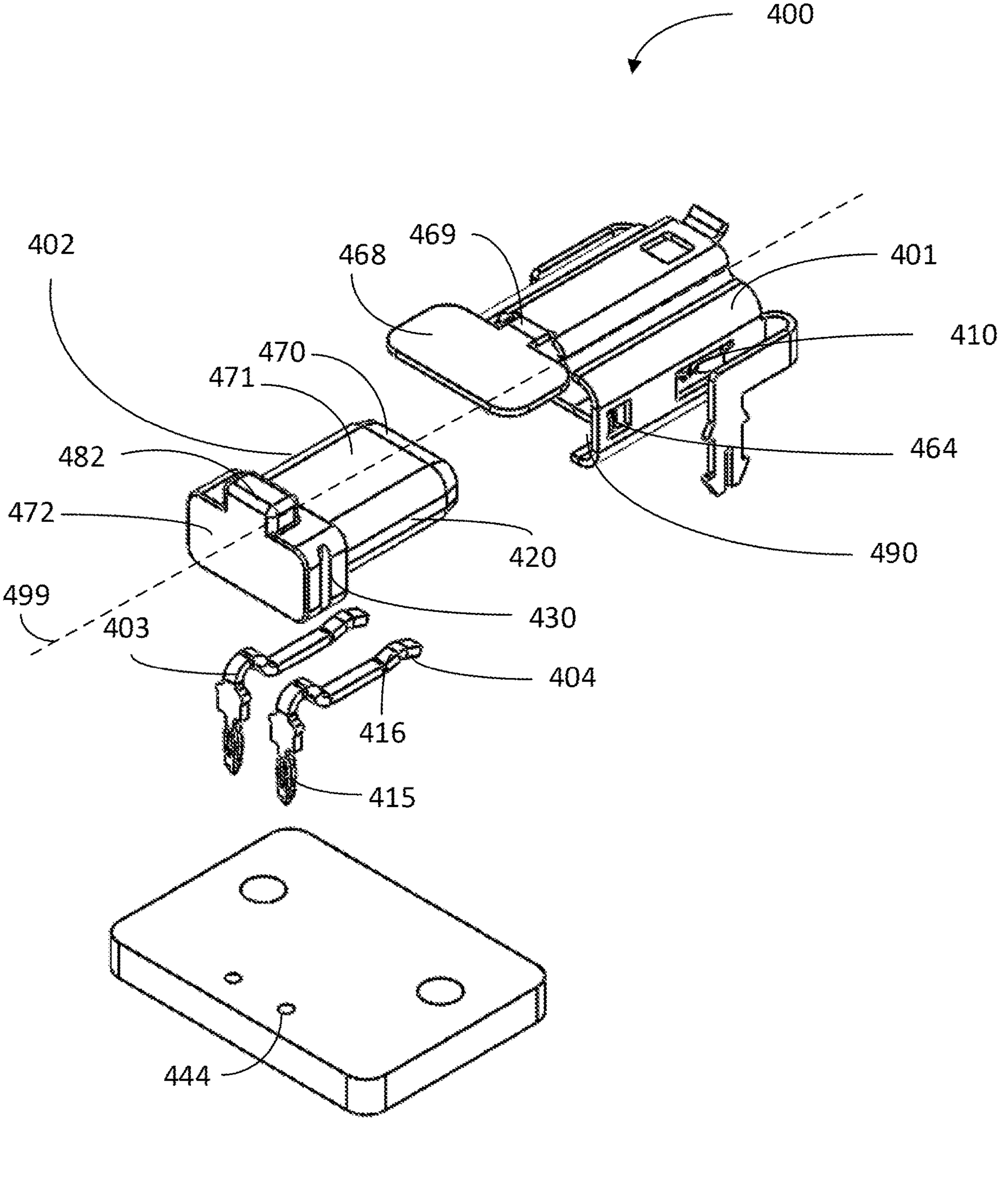
FIGS. 4A and 4B are exploded views of the female connector of the SPE connector in accordance with illustrative embodiments.

FIG. 4A depicts an exploded view of the female connector 400 of a SPE connector in accordance with illustrative embodiments. The female connector 400 includes an outer shield 401, an insulative housing 402, a first contact 403, and a second contact 404.

The outer shield 401 may be pre-fabricated or otherwise constructed to form a cage-like structure that is configured to receive the insulative housing 402 and mechanically secure the insulative housing 402 therein. In an embodiment, a first tongue 410 may be designed to apply a force to a surface 420 and a second tongue on an opposite side of the outer shield may be designed to apply an opposing force to provide lateral support the insulative housing. In an alternative embodiment, the surface 420 may be a groove. For example, the outer shield 401 may include the first tongue 410 that is designed to be seated within a groove 420 of the insulative housing 402 in order to guide and position the insulative housing 402 within the cage-like structure of the outer shield 401. Similarly, in an example embodiment, the outer shield 401 may include the second tongue formed in a side of the cage like structure opposite from the first tongue 411 that is designed to be seated within a corresponding second grove of the insulative housing 402 positioned on a side opposite the groove. In some embodiments, the first and second tongues may be configured to be displaced from the groove by a respective male connector when the male connector is inserted and/or latch with corresponding dimples of the male connector to mechanically secure the female and male connectors together. In some embodiments, the first tongue 411, the second tongue, and the cage-like structure 490 may be formed of a single element or material.

The outer shield 401 may also include a first pin 464 that is designed to be seated within a first notch 430 of the insulative housing 402 such that the insulative housing 402 is mechanically secured within the outer shield 401 once the first pin 464 locks with the first notch 430. Similarly, the outer shield 401 may include a second pin positioned on a side opposite the first pin 464 that is designed to be seated within a second notch of the insulative housing 402 positioned on a side opposite the first notch 430.

The insulative housing 402 may include a tapered portion 470, a nose portion 471, and a base portion 472. The base portion 472 may include the first notch 430 and the second notch positioned on sides opposite from one another. The base portion 472 may also include an anvil 482. The anvil 482 may extend away perpendicularly relative to an axis 499 of the insulative housing 402. The anvil 482 is designed to provide support to a hinge portion 469 of the outer shield 401 such that an end portion 468 of the outer shield 401 can be closed when the insulative housing 402 is moved along the axis 499 to a position within the outer shield 401. The base portion 472 may be sized such that the base portion 472 fits snug within the cage-like structure of the outer shield 401. Further, the anvil 482 may be sized and positioned such that fits within the indented ridge of the outer shield 401. The nose portion 471 extends from the base portion 472 along the axis 499 and is sized such that there is room between the cage-like structure 490 and the nose portion 471 to allow for a corresponding portion of a male connecter to also be positioned within the cage-like structure. The tapered portion 470 extends from the nose portion 471 along the axis 499 and is tapered to a smaller size than the nose portion 471. The tapered portion 470 may assist with guiding a corresponding male connector around the nose portion 471.

The first contact 403 and the second contact 404 may be similar in structure. For example, the first and second contact 403 and 404 may include a press-fit pin 415 at a first end and a contact tine 416 at a second, distal end. In some embodiments, the first and second contact 403 and 404 may include a different type of contact at the second end. For example, the second end may include a socket or interlock contact. The press-fit pin 415 is structured to protrude from the female connector (e.g., past the outer shield 401) and retention ribs provide support from all lateral movements in order for the press-fit pin 415 to be compressed into a corresponding PCB hole 444 without damaging the components. Contact tine 416 is structured such that the contact tine 416 is positioned near a bottom of a respective recess in the insulative housing 402 to create a pinch point therebetween. The pinch point causes the contact tine 416 to compress a corresponding pin or blade of an IDC contact of a respective male contact. The compression ensures a reliable and secure electrical mechanical connection therebetween. The structure of the first and second contact 403 and 404 is also discussed in reference to FIG. 5A below.

Figure 4B:
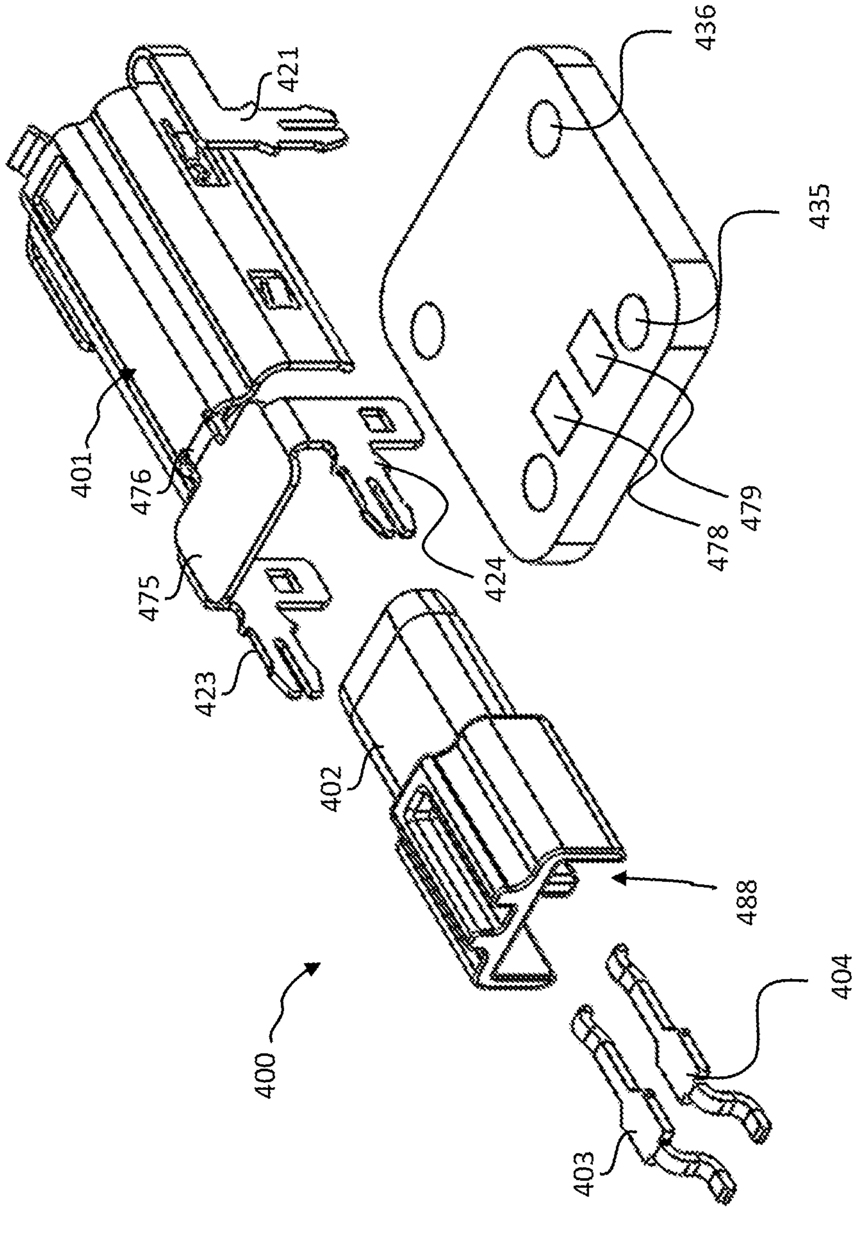

FIG. 4B depicts an exploded view of the female connector 400 of a SPE connector in accordance with another illustrative embodiment. The female connector 400 of FIG. 4B includes various similar features as the female connector 400 of FIG. 4A as will be evident from the figures but also includes additional or different features as discussed below. The female connector 400 includes an outer shield 401, an insulative housing 402, a first contact 403, and a second contact 404. The outer shield 401 is configured to be placed over the insulative housing 402 except for along a first side that is configured to receive a portion of a respective male connector. The outer shield 401 includes a first latching pin 421, a second latching pin (not visible), a third latching pin 423, and a fourth latching pin 424 that are each structured to mechanically secure the outer shield 401 to a respective PCB via latching or mechanically bonding with a corresponding opening (e.g., opening 435, 436, etc.) of the PCB.

The outer shield 401 further includes an end portion 475 that is connected to a main body portion of the outer shield 401 by a transition portion 476. In an embodiment, the transition portion 476 comprises a portion smaller in width than the end portion 475 that may be subsequently bent or folded to position the end portion 475 perpendicular to the respective surfaces of the main body portion of the outer shield 401. Respective extension portions extend from the end portion 475 and are bent approximately 90 degrees relative to a primary plane of the end portion 475 such that the extension portions may overlap sides of the main body portion of the outer shield 401.

The first contact 403 and the second contact 404 of FIG. 4B may be similar in structure. For example, the first and second contact 403 and 404 may include a first end configured for electrical connection to a contact pad (e.g., contact pads 478, 479 via interference fit, solder, etc.) and a contact tine at a second, distal end configured for electrical connection to a contact portion of a male contact. In some embodiments, the first and second contact 403 and 404 may include a different type of contact at the second end. For example, the second end may include a socket or interlock contact. The insulative housing 402 of FIG. 4B includes an open end 488 through which the first and second contacts 403, 404 may be placed within the insulative housing 402. The structure of the first and second contact 403 and 404 is also discussed in reference to FIG. 5C below.

Figure 5B:
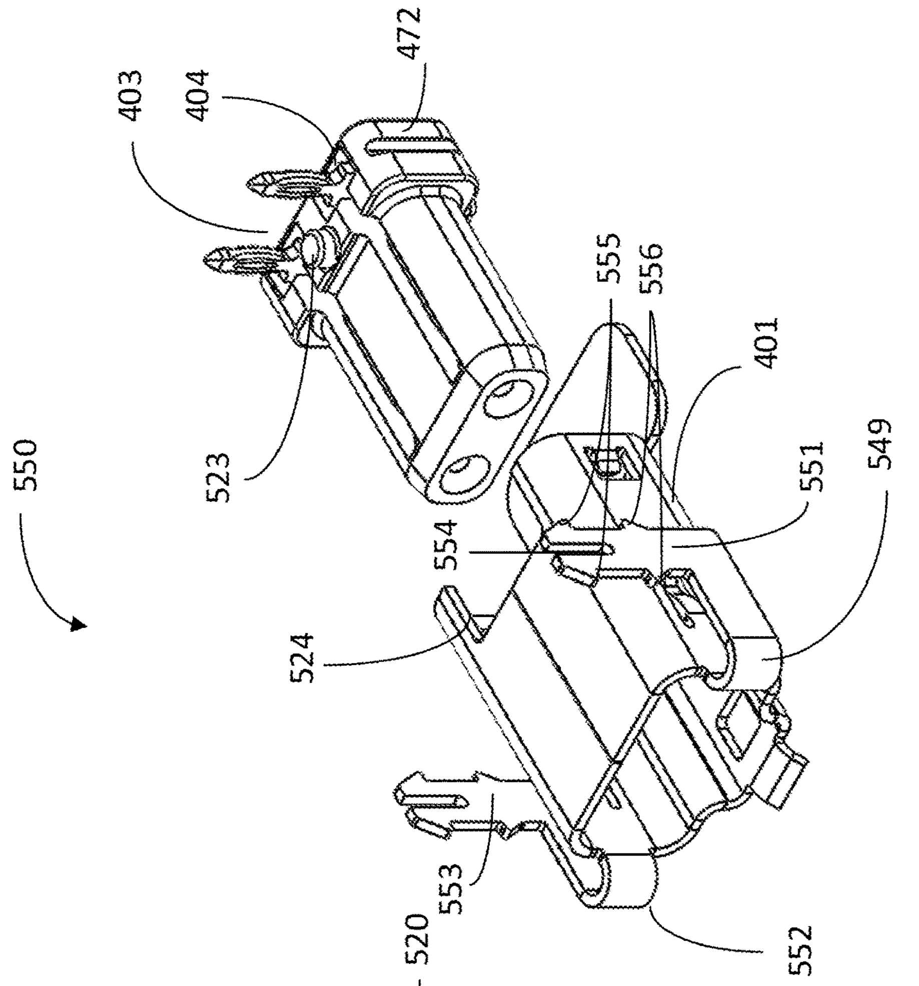
FIGS. 5A-5D are assembly views of the female connector of the SPE connector in accordance with illustrative embodiments.
Figure 5A:
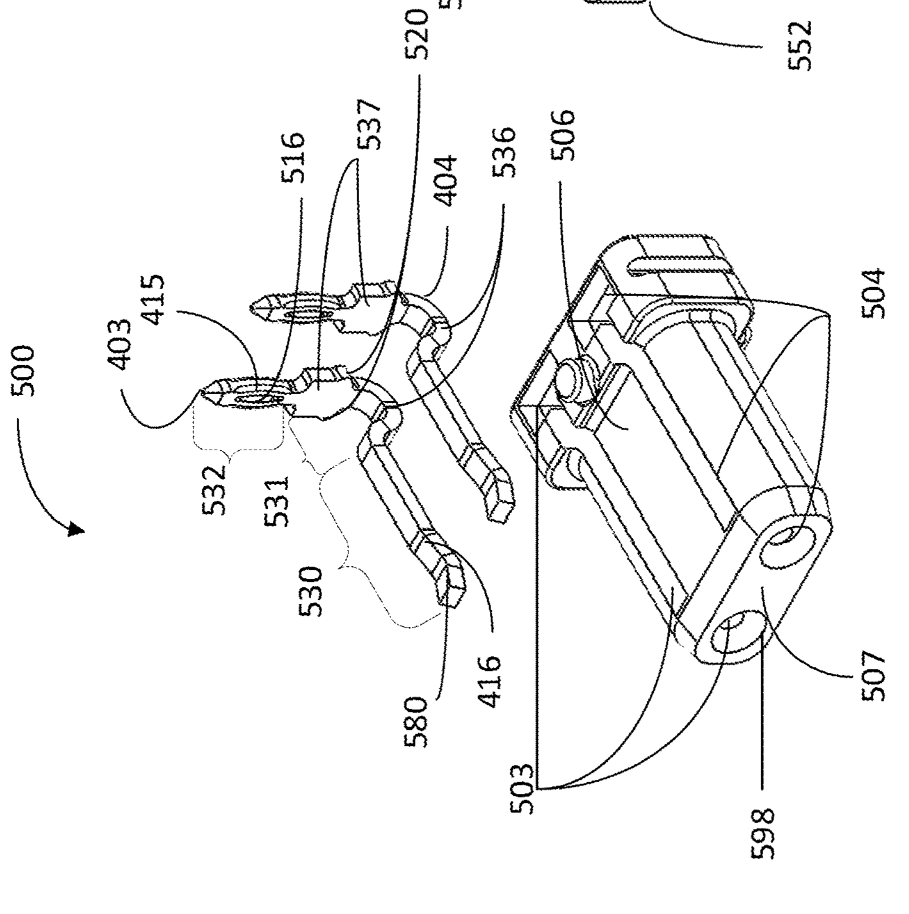

FIGS. 5A and 5B are assembly views 500 and 550 of the female connector 400 of a SPE connector in accordance with illustrative embodiments. More particularly, FIG. 5A is an assembly view 500 of the first contact 403, a second contact 404, and an insulative housing 402. FIG. 5B is an assembly view 550 of the first contact 403 seated within a first recess 503 of the insulative housing 402, the second contact 404 seated within a second recess 504 of the insulative housing 402, and the outer shield 401.

Referring generally to FIG. 5A now, the insulative housing 402 includes a first contact retention recess 503 structured to receive and house the first contact 403 and a second contact retention recess 504 structured to receive and house the second contact 404. The first and second contact retention recesses 503 and 504 are formed within the insulative housing 402 such that the first contact 403 and second contact 404 can be placed within the recesses 503 and 504 on a first side 506, respectively, and an opening 598 along a second side 507 that is perpendicular to the first side 506 allows for insertion of a portion of a contact of a respective male connector. The opening 598 may include a bevel that is structured to guide the portion of the contact of the respective male connector (e.g., pin or blade) within the respective recess 503 or 504 to electrically and mechanically connect to the respective contact 403 or 404.

Still referring to FIG. 5A, the first and second contacts 403 and 404 include a deflection end 530, a transition portion 531, and a press-fit end 532. In this example, the press-fit end 532 includes a press-fit compliant pin 415 that is configured to be inserted into respective holes on a PCB board. The press-fit compliant pin 415 includes a center slot 516. The center slot 516 allows for the pins to compress horizontally as the press-fit compliant pin 415 is vertically compressed into the corresponding hole on the PCB. The horizontal compression results in the press-fit compliant pin 415 having stored elastic energy and further exerting an outward force (e.g., against the corresponding conductive hole of the PCB). The outward force ensures that a mechanical and electrical connection is maintained between the electrical contacts and the PCB. The press-fit compliant pin 415 extends from the transition portion 531 (i.e., proximal end) to a distal end. Specifically, the transition portion 531 includes a transition base 536 and a press-fit base 537. The press-fit base 537 and the press fit pin 415 extend in a parallel direction along a first plane. The transition base 536 extends from the press-fit base 536 in a “U” shape. The “U” shape of the transition base 536 allows for the transition base to be seated within a saddle seat (e.g., described in reference to FIG. 2) of a respective recess that prevents lateral movements and increases stability once the contact is placed within the insulative housing 402.

The deflection end 530 includes a deflective contact tine 416 that extends from an end (i.e., the transition base 536) of the transition portion 531 that is opposite from the where the press-fit pin 416 extends from. The deflective contact tine 416 extends from the transition base 536 to a distal end in a direction that is non-parallel to direction the press-fit pin 415 extends. The deflective contact tine 416 may extend from the transition base 536 in a direction perpendicular the direction which the press-fit compliant pin extends 415. The deflective contact tine 416 may then further extend along a first angular plane that is obtuse to the plane in which the press-fit pin extends. For example, the deflective contact tine 416 may extend toward or past a plane defined tangentially at the bottom of the “U” shape of the transition base 536. Such a configuration may ensure that the distal end of the contact tine 416 is positioned near the bottom or against the bottom of a respective recess in the insulative housing 402 such as to create a pinch-point therebetween. The pinch-point, when a corresponding pin of the male connector is inserted, causes the transition base 536 and/or the deflective contact tine 416 to deflect and compress the corresponding pin. In some embodiments, the contact tine 416 extends from the transition portion 531 a distance and then curves such that the contact tine 416 includes a dip or curve at the distal end. In other words, the deflective contact tine 416 extends from the transition portion 531 a distance along the angular plane described above, then further along a second angular plane that is greater relative to the plane in which the press-fit compliant pin 415 extends, and further along a third angular plane that is lesser than the relative to the plane in which the press-fit compliant pin 415 extends. The curvature 580 near the distal end of the contact tine 416 may create a pinch-point with the bottom of the respective recess such that a respective pin or blade is compressed when inserted therebetween. Moreover, the curvature 580 may ensure that a respective pin or blade can reliably and efficiently be positioned in the pinch-point via sliding under the distal end of the deflective contact tine 416. In alternative embodiments, the deflection end 530 may be any configuration that allows for the first and second contacts 403 and 404 to create a mechanical and electrical connection between a corresponding pin or blade of a male connector and the respective first or second contact 403 or 404.

Moreover, the first and second contacts 403 and 404 may also include two retention ribs 520 that extend outwards from the press-fit base 537 near the connection with the female-end base 536. The retention ribs 520 both restrict how far the first and second contacts 403 and 404 may be inserted into a recess of an insulative housing and also provide a structural support for the contact by mechanically touching the inside of the recess of the insulative housing and thereby preventing lateral movements.

Referring generally to FIG. 5B, the first and second contacts 403 and 404 are seated within the respective contact retention recesses 503 and 504 of the insulative housing 402. The insulative housing 402 may then be positioned adjacent to the outer shield 401. The insulative housing 402 may include a standoff pin 523 formed on the base portion of the insulative housing 402. The outer shield 401 includes a cut-out 524 of the cage-like structure. The cut-out 524 allows for the press-fit pins 415 to protrude out from the cage-like structure. The standoff pin 523 is formed on the base portion 472 and positioned to restrict the insulative housing 402 from being over-inserted into the outer shield 401. Moreover, the standoff pin 523 is structured to also prevent over-insertion of the press-fit compliant pins into the PCB.

The outer shield 401 includes a first arm 549 that extends from an edge on a first side of the cage-like structure to a first latching pin 551 and a second arm 552 that extends from the edge on a second side opposite the first side to a second latching pin 553. The first arm 549 extends away from the edge in a "U" shape such that the arm extends further from the "U" shaped portion along a plane parallel to the first side along the first side to the second latching pin 553. Similarly, the first arm 549 extends away from the edge in a "U" shape such that the arm extends further from the "U" shaped portion along a plane parallel to the second side along the second side to the second latching pin 553. The shape and structure of first and second arms 549 and 552 allow a user to press down on the arms to compress the first and second latching pins 551 and 553 into respective holes on the PCB. The first and second latching pin 551 and 553 extend in a direction perpendicular to the first and second arms 549 and 552 in a direction that is parallel to the direction in which the press-fit pins of the contacts extend when the contacts are placed within the outer shield 401.

The first and second latching pins 551 and 553 may have similar structure. For example, the latching pins 551 and 553 include a gap 554 that extends from a distal end of the pin, retention ridges 555 that extend outward from sides of the pins, and stop ridges 556 that extend similarly from the sides of the pins. The gap 554 allows for the respective latching pin to be compressed into a through-hole on the PCB. The retention ridges 555 ensure that the latching pin mechanically secures the outer shield 401 to the PCB. The stop ridges 556 prevent the latching pin from over insertion into the PCB. In this way, the structure of the latching pins 551 and 553 allows for them to be inserted into respective through-holes of a PCB to reliably and efficiently mechanically secure the female connector to the PCB.

Figure 5D:
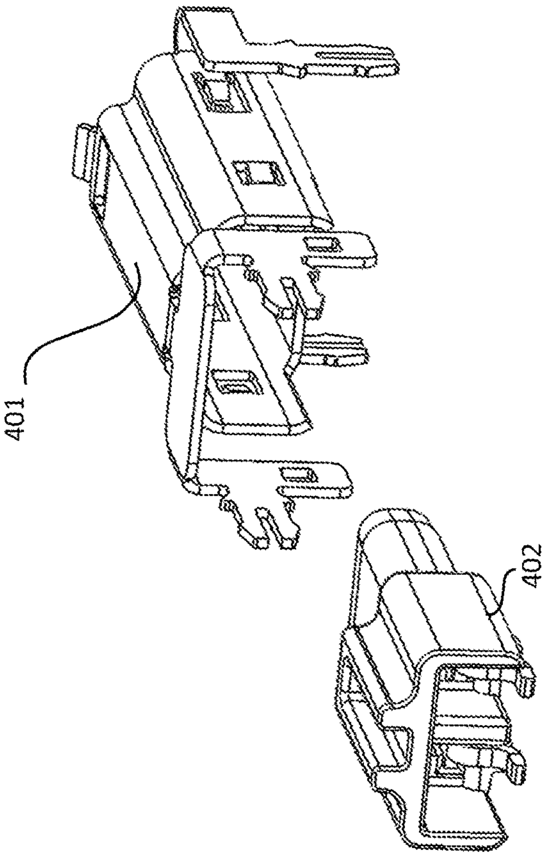
Figure 5C:
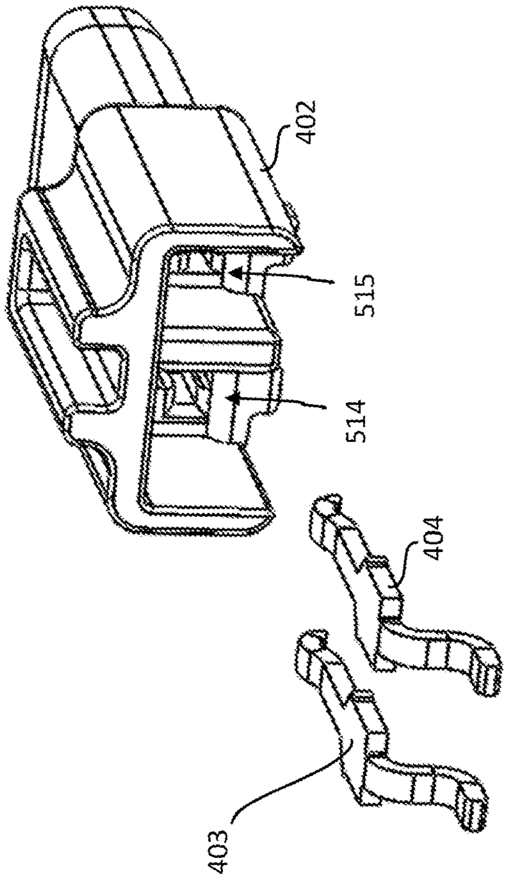

FIGS. 5C and 5D are assembly views of the female connector 400 of a SPE connector of FIG. 4B in accordance with another illustrative embodiment. The female connector 400 of FIGS. 5C and 5D includes various similar features as the female connector 400 of FIGS. 5A and 5B as will be evident from the figures but also includes additional or different features as discussed below. More particularly, FIG. 5C is an assembly view of the first contact 403, a second contact 404, and an insulative housing 402. FIG. 5D is an assembly view of the first contact 403 seated within a first recess 514 of the insulative housing 402, the second contact 404 seated within a second recess 515 of the insulative housing 402, and the outer shield 401. In the seated position shown in FIG. 5D, the distal end of the contacts 403 and 404 extends slightly outward from (and below) an bottom surface of the insulative housing 402 such that upon engagement of the female connector 400 with a corresponding PCB, engagement of the latching pins of the female connector 400 with corresponding openings in the PCB will hold the distal ends of the contacts 403 and 404 against corresponding contact pads on the PCB, thereby forming an electrical connection between the contacts 403 and 404 and the respective contact pads on the PCB.

Figure 6B:
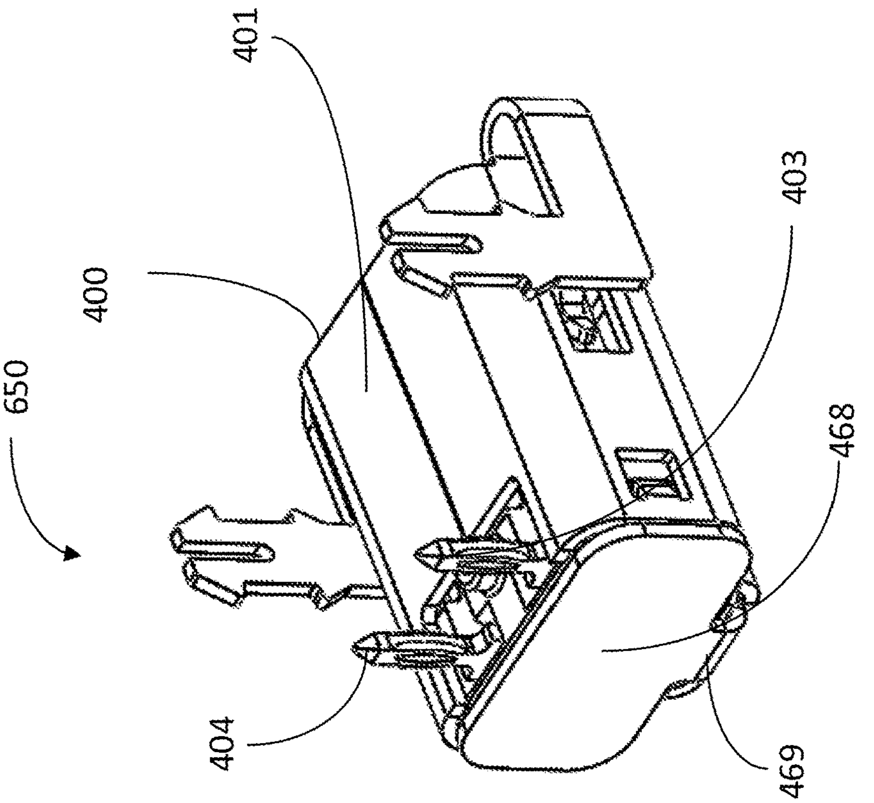
FIGS. 6A and 6B are assembly views of the female connector of the SPE connector in accordance with an illustrative embodiment.
Figure 6A:
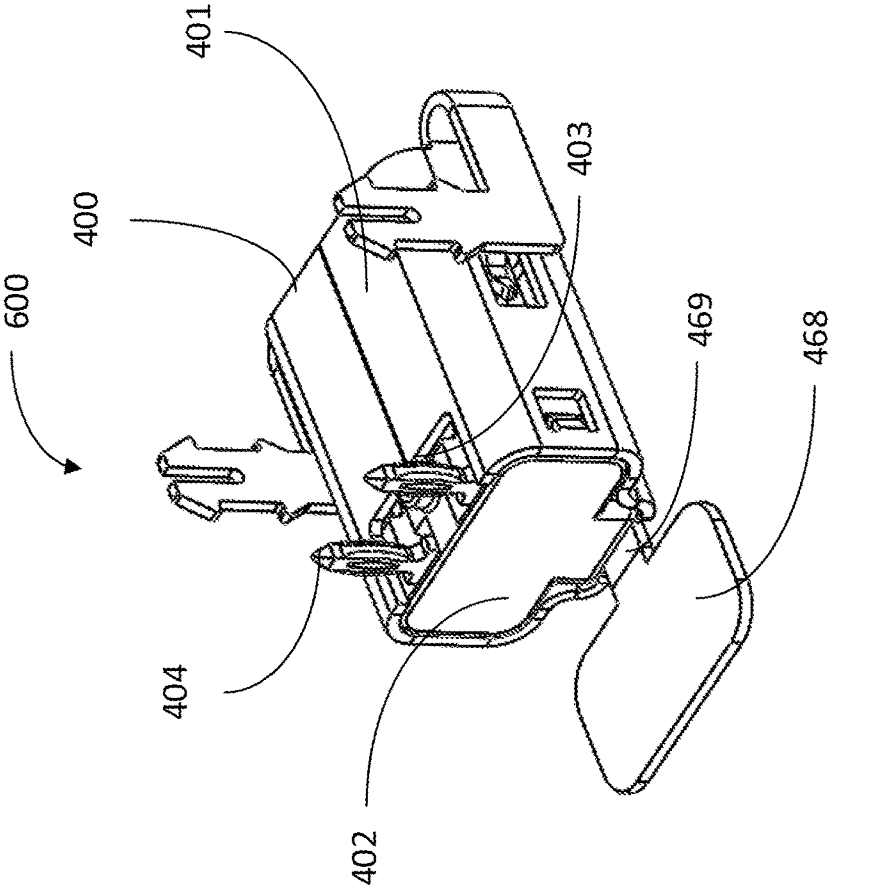

FIGS. 6A and 6B are assembly views 600 and 650 of the female connector 400 of a SPE connector in accordance with an illustrative embodiment. More particularly, FIG. 6A is an assembly view 600 of the first and second contacts 403 and 404 seated within the insulative housing 402 and the insulative housing 402 positioned within the cage-like structure of outer shield 401. The end portion 468 of the outer shield 401 is positioned in the open position such that the insulative housing 402 can be inserted or removed from the cage-like structure of the outer shield 401. FIG. 6B depicts an assembly view of the first and second contacts 403 and 404 seated within the insulative housing 402 and the insulative housing 402 mechanically secured within the outer shield 401. That is, the end portion 468 of the outer shield 401 is positioned in the closed position to secure the insulative housing 402 within the outer shield 401. The end portion 468 may be bent at the hinge 469 such that the material of the hinge 469 or outer shield 401 deforms into the closed position. In alternative embodiments, other types of hinges and/or mechanical latches may be implemented. The female connector 400 in the closed position ensures that outer shield 401 is providing maximum protection from electromagnetic interference.

Figure 6D:
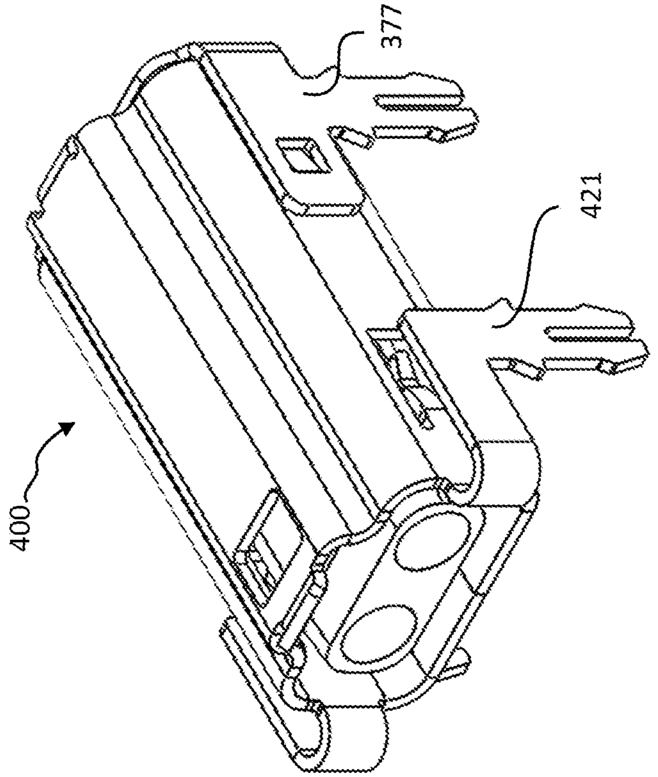
FIGS. 6C and 6D are assembly views of the female connector of the SPE connector in accordance with another illustrative embodiment.
Figure 6C:
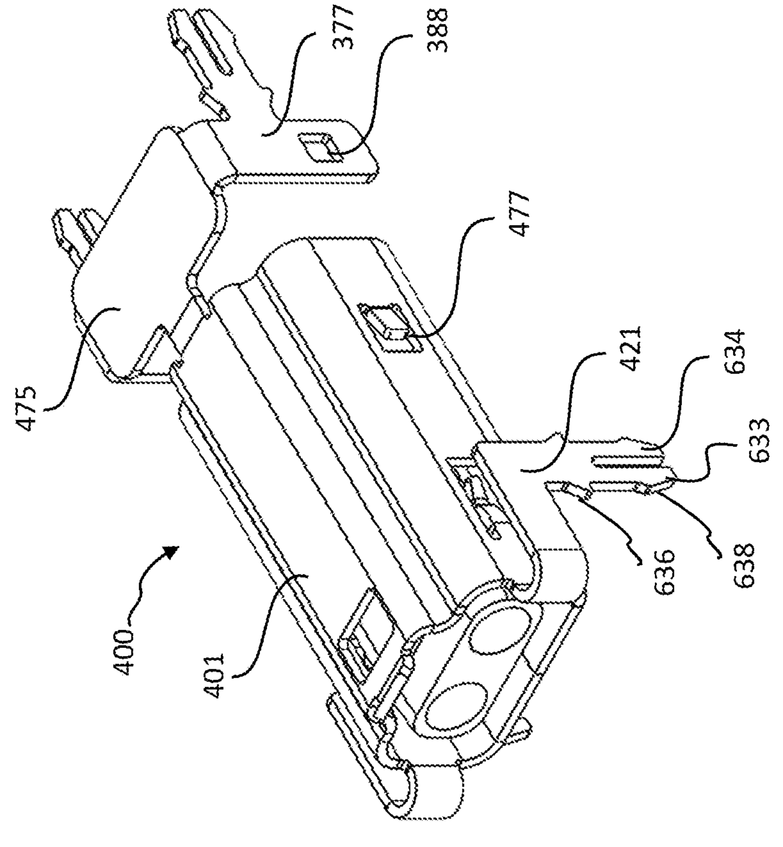

FIGS. 6C and 6D are assembly views of the female connector 400 of a SPE connector of FIG. 4B in accordance with an illustrative embodiment. The female connector 400 of FIGS. 6C and 6D includes various similar features as the female connector 400 of FIGS. 6A and 6B as will be evident from the figures but also includes additional or different features as discussed below. More particularly, FIG. 6C is an assembly view of the female connector 400 with the end portion 475 of the outer shield 401 still in an open position. FIG. 6D is an assembly view of the female connector 400 with the end portion 475 of the outer shield 401 in a fully closed position. As shown in FIG. 6C, an extension portion 377 extends from the end portion 475 and includes an opening 388 that is configured to engage a retention clip 477 on the side of the main body portion of the outer shield 401 to hold the end portion 375 in place when it is moved into a closed position.

Female connector 400 further includes various latching pins (e.g., latching pin 421). In an embodiment, latching pin 421 (as well as one or more of the other latching pins) includes first and second prongs 633 and 634 that may be configured such that they may be compressed when engaged with an opening of a corresponding PCB. Each prong 633, 634 includes an upper retention knob 636 and a lower retention knob 638 to position the female connector 400 at a desired distance from the PCB upon full engagement of the female connector (and corresponding latching pins) with the PCB. In an embodiment, the distance between the upper retention know 636 and the lower retention knob 638 approximates or is slightly greater than an depth of the PCB such that, upon engagement of the latching pin with the PCB, the upper retention knob 636 will be seated adjacent an upper surface of the PCB and the lower retention knob 638 will be seated adjacent a lower surface of the PCB.

Figure 7A:
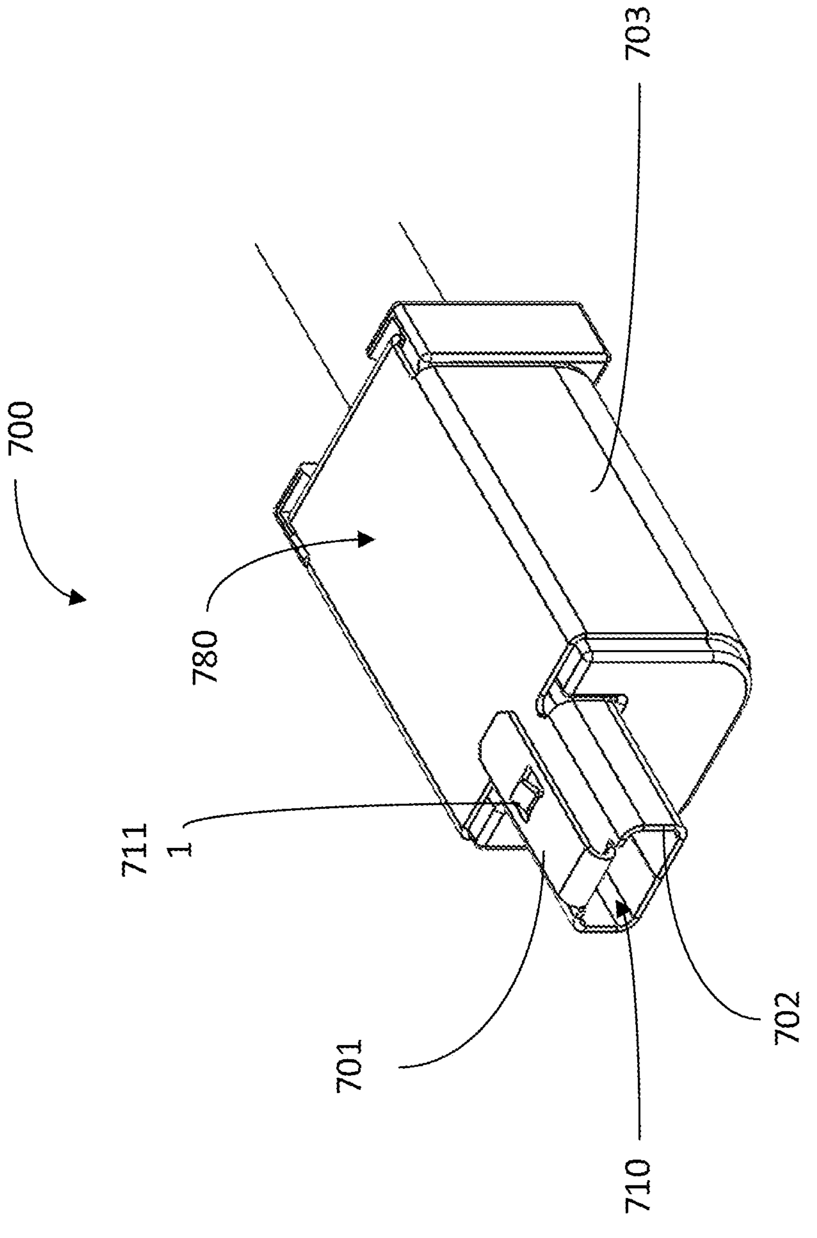
FIG. 7A is an isometric view of a male connector of the SPE connector in accordance with an illustrative embodiment.

FIG. 7A is an isometric view of a male connector 700 of a SPE connector in accordance with an illustrative embodiment. The male connector 700 of FIG. 7B includes various similar features as the male connector 700 of FIG. 7A as will be evident from the figures but also includes additional or different features as discussed below. The male connector 700 includes an interlock arm 701, an outer shield including a first cage-like structure 702 and a second cage-like structure 703. In an embodiment, the first cage-like structure 702 of the outer shield is structured such that an opening 710 allows for pins or blades within the first cage-like structure to be connected to a corresponding female connector. The interlock arm 701 extends outwardly from an edge of the opening 710 of the first cage-like structure 702 in a curved shape and back toward the second cage-like structure 703 in a plane parallel to a plane which a first side 780 of the first cage-like structure 702 extends. The curved shape allows for the interlocking arm 701 to flex when inserted into a corresponding portion of a female connector and to engage an interlocking pin 711 with a corresponding notch or opening of the female connector thereby latching the connectors together.

Figure 7B:
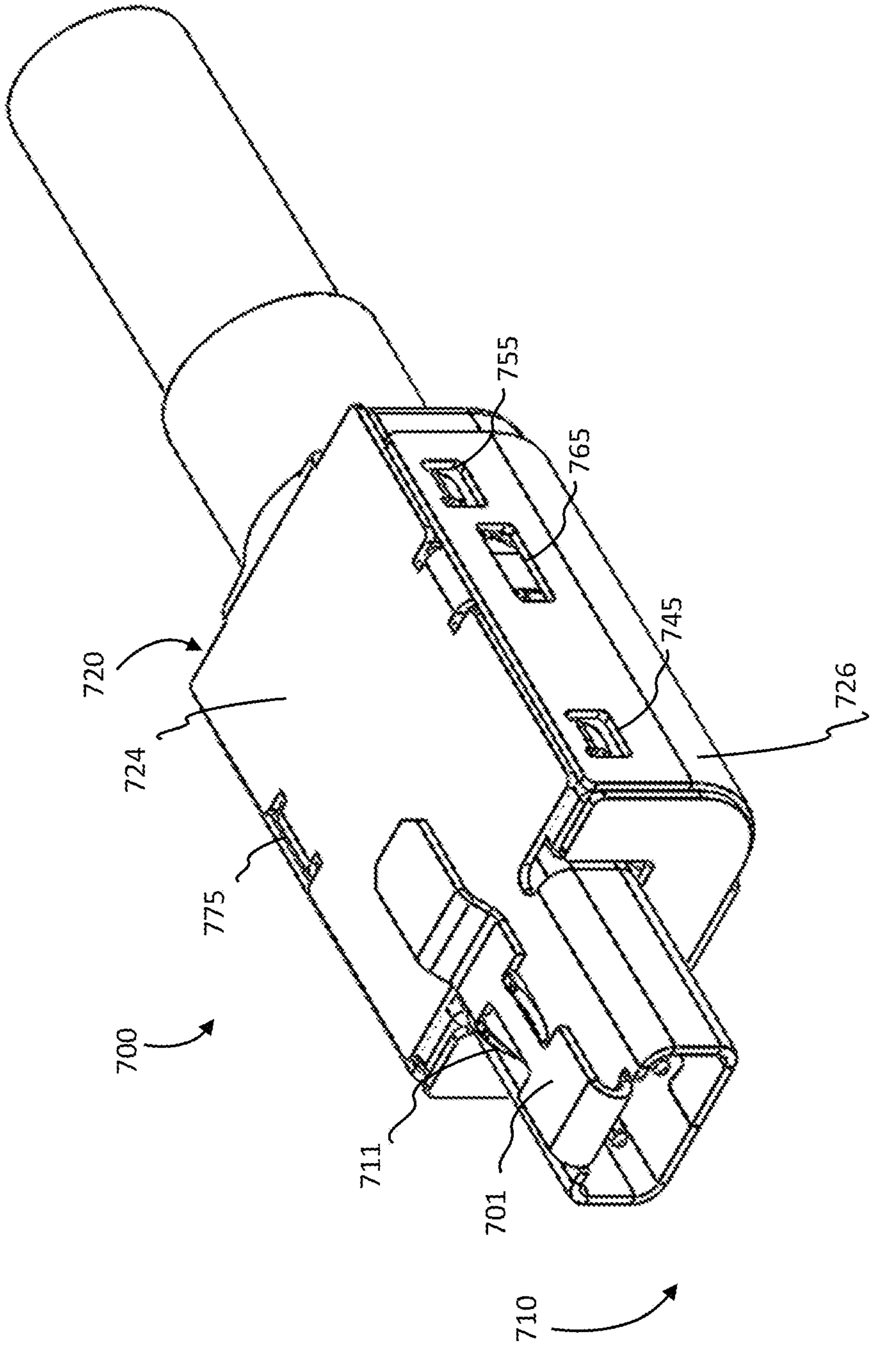
FIG. 7B is an isometric view of a male connector of the SPE connector in accordance with another illustrative embodiment.

FIG. 7B is an isometric view of a male connector 700 of a SPE connector in accordance with another illustrative embodiment. The male connector 700 of FIG. 7B includes various similar features as the male connector 700 of FIG. 7A as will be evident from the figures but also includes additional or different features as discussed below. The male connector 700 includes an interlock arm 701 and a two-piece metal shield 720 formed from an inner shield portion 724 and an outer shield portion 726. The outer shield portion 726 is fixed to the inner shield portion 724 via one or more retention features. For example, retention features 745 and 755 include retention clips on the outer shield portion 726 that engage recessed portions of an inner housing. Retention features 765 and 775 include windows in the outer shield portion 726 that engage corresponding clip portions of the inner shield portion 724.

The interlock arm 701 extends outwardly from an edge of the opening 710 of the shield 720 in a curved shape and back toward an opposite end of the connector in a plane parallel to an adjacent surface of the connector. The curved shape allows for the interlocking arm 701 to flex when inserted into a corresponding portion of a female connector and to engage an interlocking pin portion 711 with a corresponding notch or opening of the female connector thereby latching the connectors together. In an embodiment, the interlocking pin portion 711 includes respective wings folded off of opposite sides of an central portion of the interlock arm 701. The wings may be symmetrical about the central portion of the interlock arm 701.

Figure 8A:
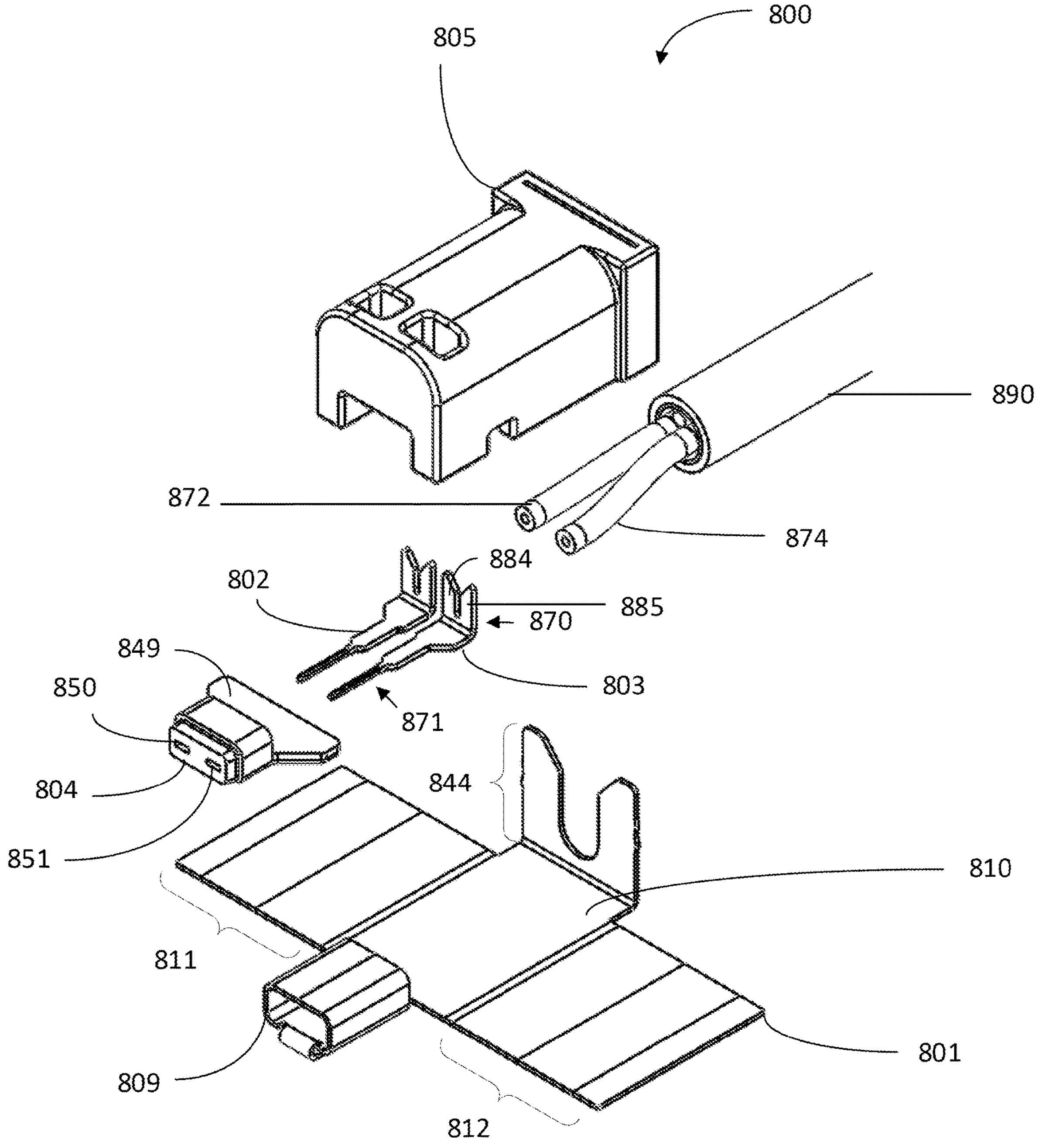
FIGS. 8A and 8B are exploded views of the male connector in accordance with illustrative embodiments.

FIG. 8A is an exploded view of the male connector 800 in accordance with illustrative embodiments. The male connector 800 includes an outer shield 801, a first IDC contact 802, a second IDC contact 803, a first insulative housing 804, and a second insulative housing 805. The outer shield 801 includes a base portion 810, a first flexible portion 811 extending outwardly from a first edge of the base portion 810, a second flexible portion 812 extending outwardly from a second edge opposite first edge of the base portion 810, and a wire retention portion 844 extending outwardly and perpendicularly from a third side of the base portion 810. The outer shield 801 also includes a first shield 809 extending from a center portion of a fourth side opposite the third edge of the of the base portion 810. The first shield 809 is similar to the first shield 702 forming the first cage like structure discussed in reference to FIG. 7A. The first and second flexible portions 811 and 812 are structured to be adjusted into a cage-like structure similar to the second shield 703 forming the second cage like structure discussed in reference to FIG. 7A.

The first insulative housing 804 includes a first contact retention opening 850 structured to form to and support the first IDC contact 802 and a second contact retention opening 851 structured to form to and support the second IDC contact 803. The first insulative housing 804 includes an insulated base 849 that is structured to provide an insulated buffer between the outer shield 801 and the IDC contacts 803 and 804 when the IDC contacts are inserted into respective contact retention openings 850 and 851. The insulated base 849 also provides mechanical support to the IDC contacts, for example, when the IDC contacts 802 and 803 are connected to or compressed with respective wires.

The first and second IDC contacts 802 and 803 include an IDC portion 870 and a pin or blade portion 871. The IDC portion 870 is structured to displace insulation from a respective wire 872 or 874 of an SPE cable 890 and form an electrical and mechanical connection therebetween. For example, a first wire 874 of the SPE cable 890 may be compressed between a first blade 884 and second blade 885 of the IDC portion 870 and the first and second blades 884 and 885 may displace the insulation of the first wire 874 and form an electrical and mechanical connection with the conductive core of the first wire 874. The second insulative housing 805 is structured such that when the second insulative housing 805 is placed and compressed onto the base portion 810 and IDC contacts 802 and 803, the second insulative housing 805 compresses the wires 872 and 874 with the IDC portions of the IDC contacts 802 and 803. Further, the second insulative housing 805 is structured to compress the SPE cable 890 into the wire retention portion 844 such that the wire retention portion 844 forms a mechanical connection with the outer portion of the SPE cable 890. For example, the mechanical connection enhances that the integrity and durability of the SPE connector by ensuring that the wires of SPE cable 890 maintain electrical and mechanical connections with the respective IDC contacts 802 and 803.

Figure 8B:
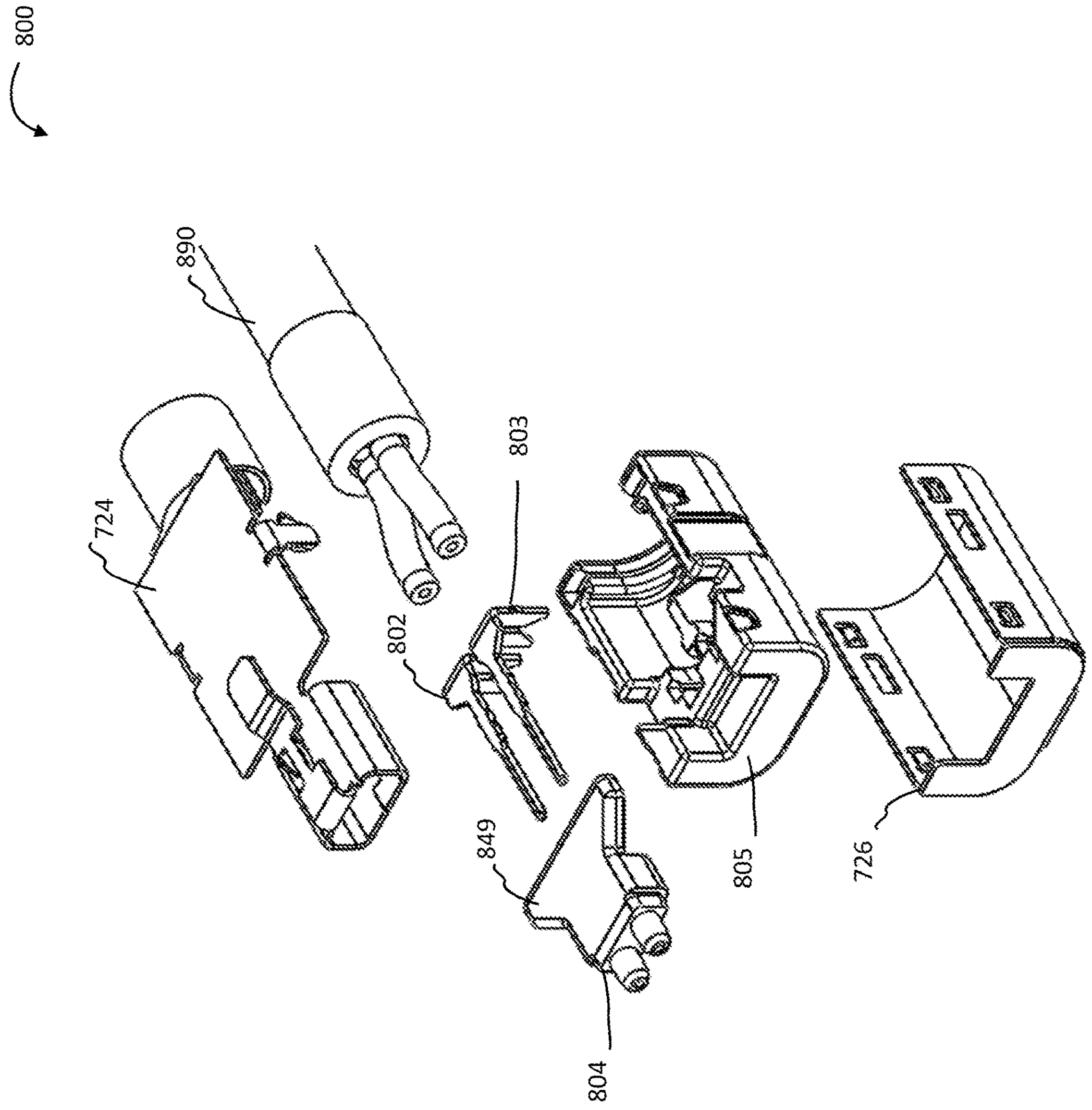

FIG. 8B is an exploded view of the male connector 800 in accordance with the illustrative embodiment of FIG. 7B. The male connector 800 includes an inner shield portion 724 (as in FIG. 7B), an outer shield portion 726 (as in FIG. 7B), a first IDC contact 802, a second IDC contact 803, a first insulative housing 804, and a second insulative housing 805.

Figure 9B:
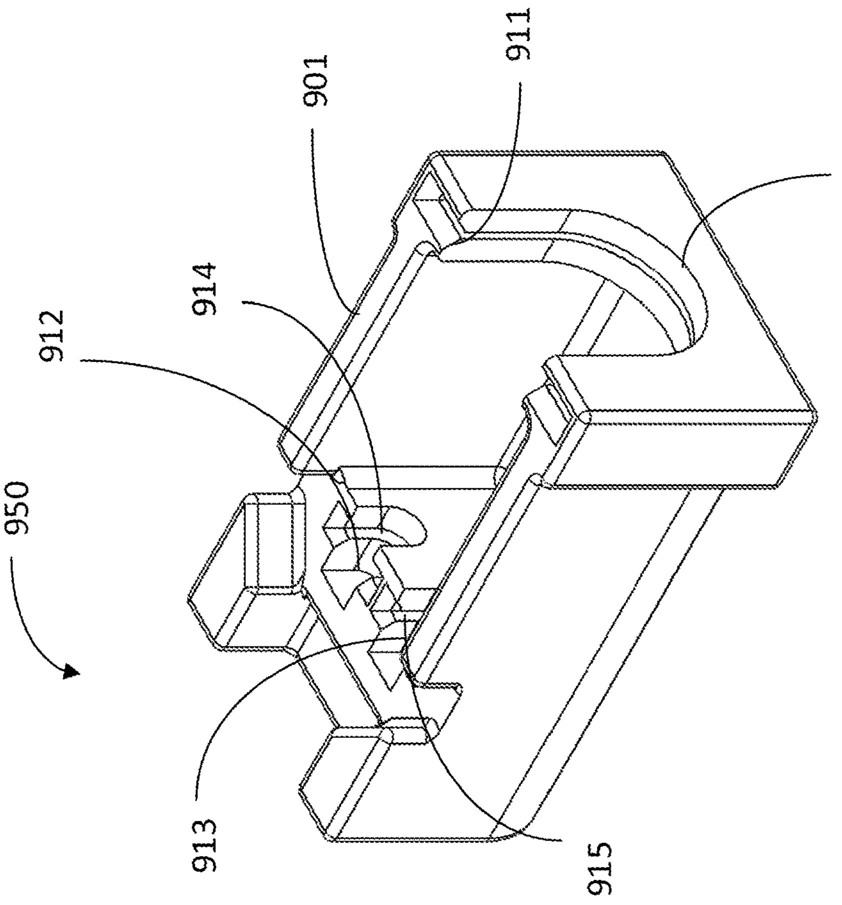
FIGS. 9A-9D are isometric views of an insulative housing of the male connector in accordance with illustrative embodiments.
Figure 9A:
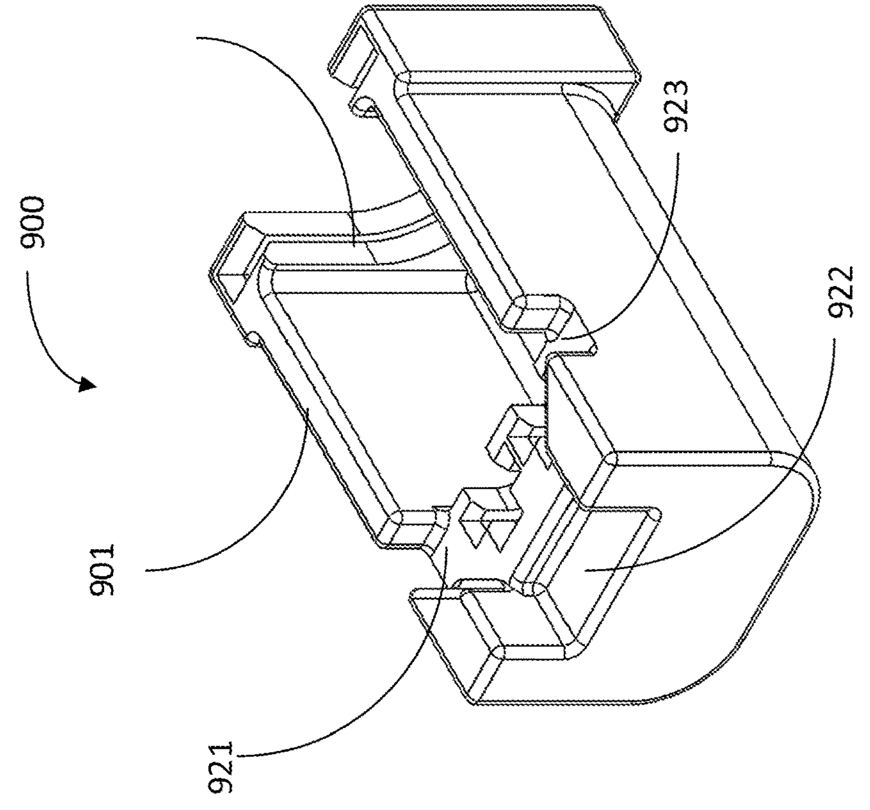

FIGS. 9A and 9B are isometric views 900 and 950 of an insulative housing 901 of the male connector in accordance with illustrative embodiments. FIG. 9A is an isometric view 900 of the insulative housing 901 along a first angle. FIG. 9B is an isometric view 950 of the insulative housing 901 along a second angle. FIGS. 9A and 9B are referred to in tandem for purposes of demonstration. The insulative housing 901 may be similar to the second insulative housing 805 discussed in reference to FIG. 8A. Referring generally to FIGS. 9A and 9B, the insulative housing 901 includes a first slotted recess 911 that is configured to receive and housing at least a portion of a wire retention portion of a corresponding outer shield, a first IDC recess 912 and a second IDC recess 913 configured to compress wires into IDC portions of IDC contacts. For example, the first IDC recess 912 includes a slotted recess 914 configured to receive and house the blade of a corresponding IDC contact while the remaining portion of the first IDC recess 912 provides a normal force (e.g., support) to the corresponding wire. The second IDC recess 913 may similarly include a slotted recess 915 configured to receive and house blades of a respective IDC contact.

The insulative housing 901 may also include a first cutaway 921, a second cutaway 922, and a third cutaway 923. The second cutaway 922 is structured to allow male portions of corresponding IDC contacts to protrude out from the insulated housing 901 when assembled. The first cutaway 921 and the third cutaway 923 such that a second insulative housing that supports and insulates the IDC contacts from an outer shield can be interlocked with the insulative housing 901 when assembled as a male connector. For example, the base portion of the second insulative housing may include butterflied sides that are configured to interlock with the first cutaway 921 and the third cutaway 923 such that the insulative housing and the second insulative housing are mechanically secured together.

Figure 9D:
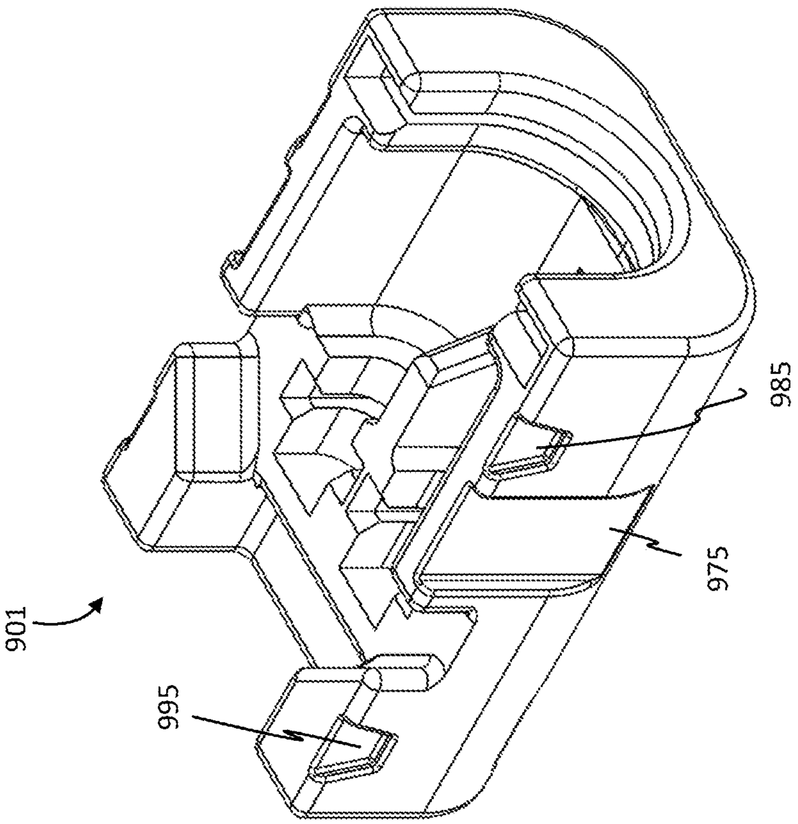
Figure 9C:
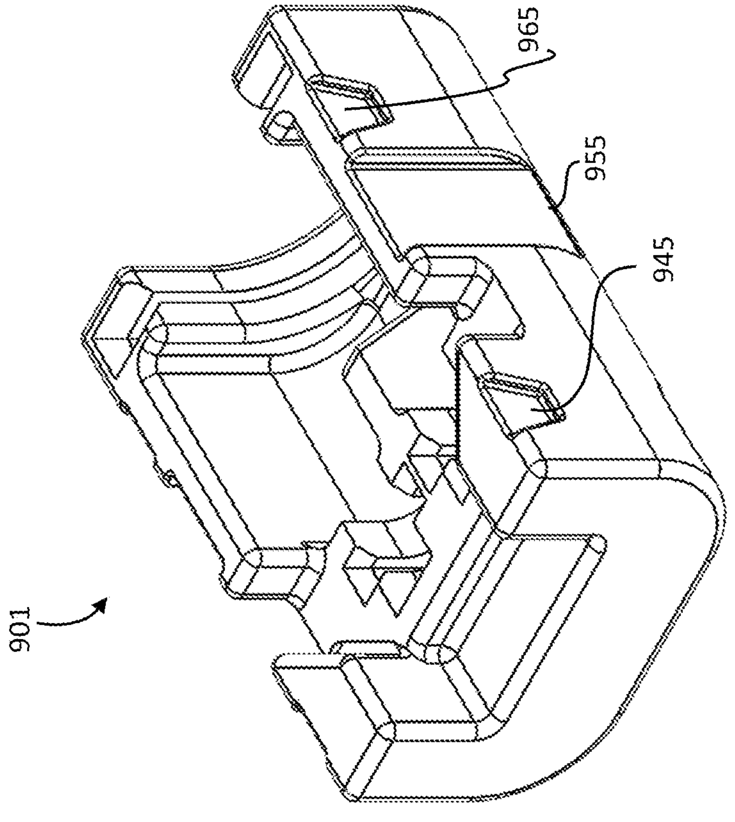

FIGS. 9C and 9D are isometric views of an insulative housing 901 of the male connector in accordance with another illustrative embodiment. The insulative housing 901 of FIGS. 9C and 9D includes various similar features as the insulative housing 901 of FIGS. 9A and 9B as will be evident from the figures but also includes additional or different features as discussed below. FIG. 9C is an isometric view 900 the insulative housing 901 along a first angle. FIG. 9D is an isometric view of the insulative housing 901 along a second angle. The insulative housing 901 corresponds to the second insulative housing 805 discussed in reference to FIG. 8B. As depicted in FIGS. 9C and 9D, the insulative housing 901 includes a plurality of recesses 945, 955, 965, 975, 985, 995 for engaging retention clips (or other retention features) of the inner and outer shield portions 724, 726 (see, e.g., FIG. 7B). In an embodiment, recesses 945, 965, 985, and 995 are configured to receive retention clips (e.g., retention clips 745, 755) extending from the outer shield portion 726 and recesses 955 and 975 are configured to receive retention clips extending form the inner shield portion 724.

Figure 10B:
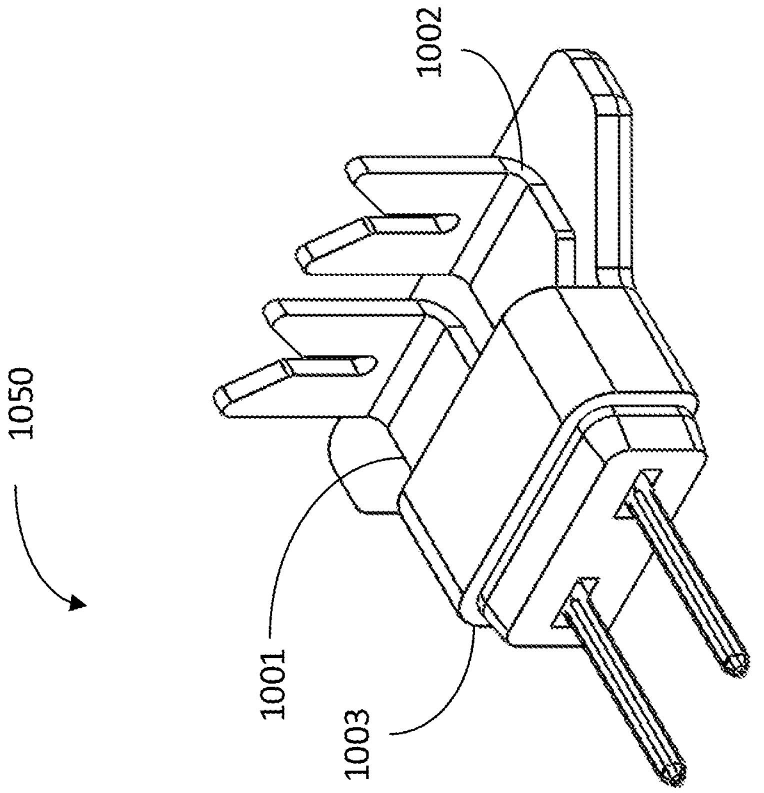
FIGS. 10A and 10B are assembly views of insulation displacement contacts (IDC) of the male connector in accordance with illustrative embodiments.
Figure 10A:
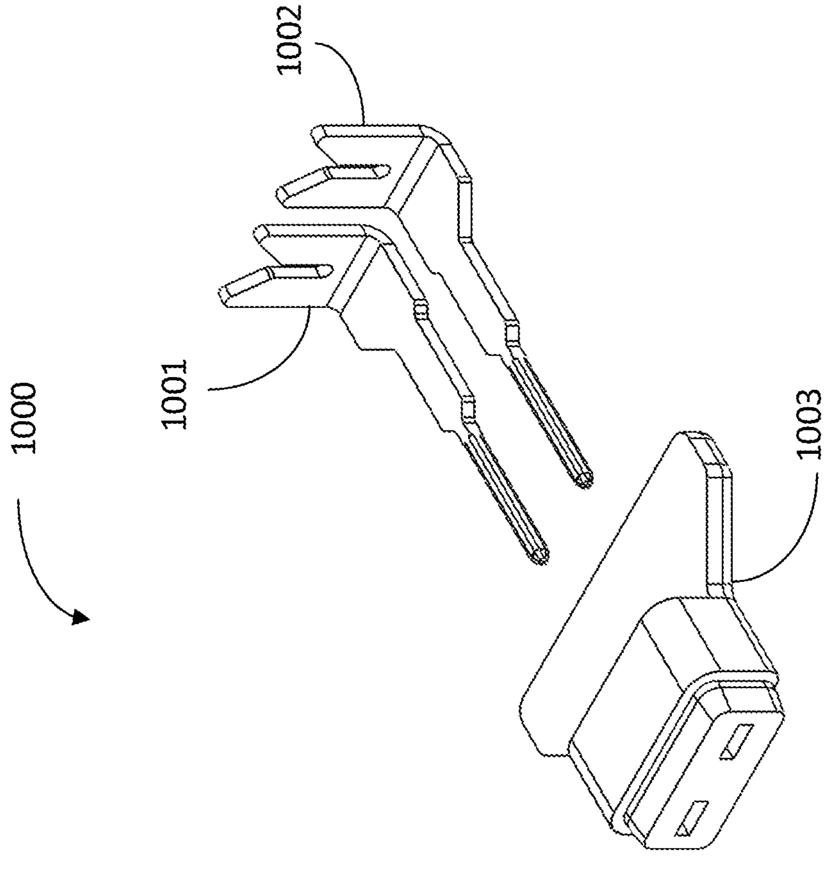

FIGS. 10A and 10B are assembly views 1000 and 1050 of insulation displacement contacts (IDC) of the male connector in accordance with illustrative embodiments. FIG. 10A is an assembly view 1000 of a first IDC contact 1001, a second IDC contact 1002, and a first insulative housing 1003. The first insulative housing 1003 is similar to the first insulative housing 804 discussed in reference to FIG. 8. FIG. 10B is an assembly view of the first and second IDC contacts 1001 and 1002 are at least partially encapsulated within respective contact retention openings of the first insulative housing 1003.

Figure 11B:
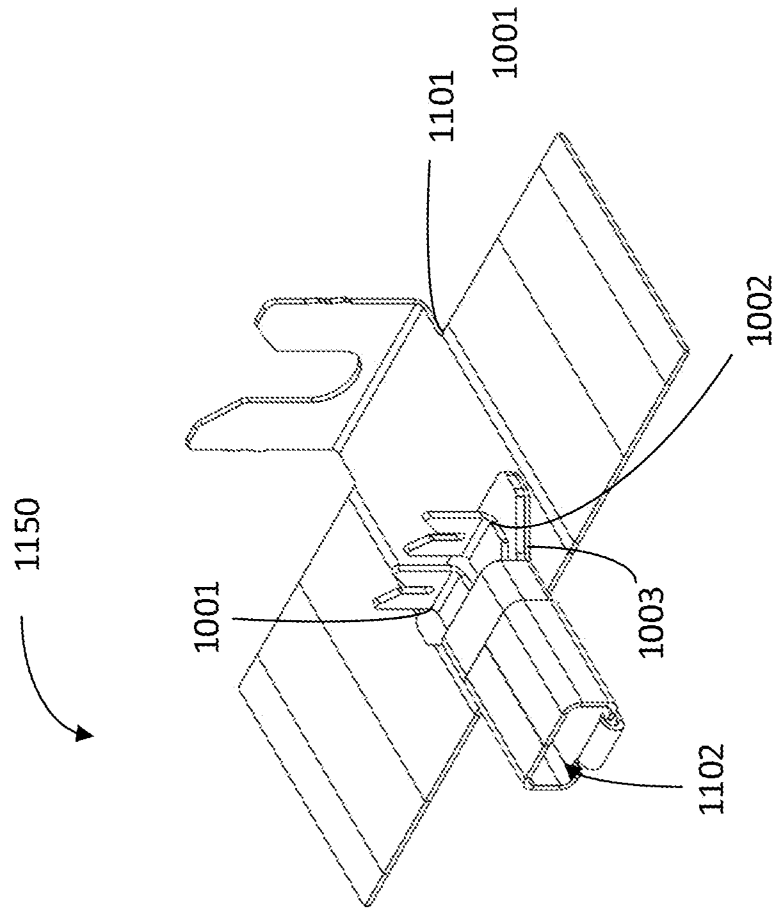
FIGS. 11A and 11B are assembly views of the male connector in accordance with an illustrative embodiment.
Figure 11A:
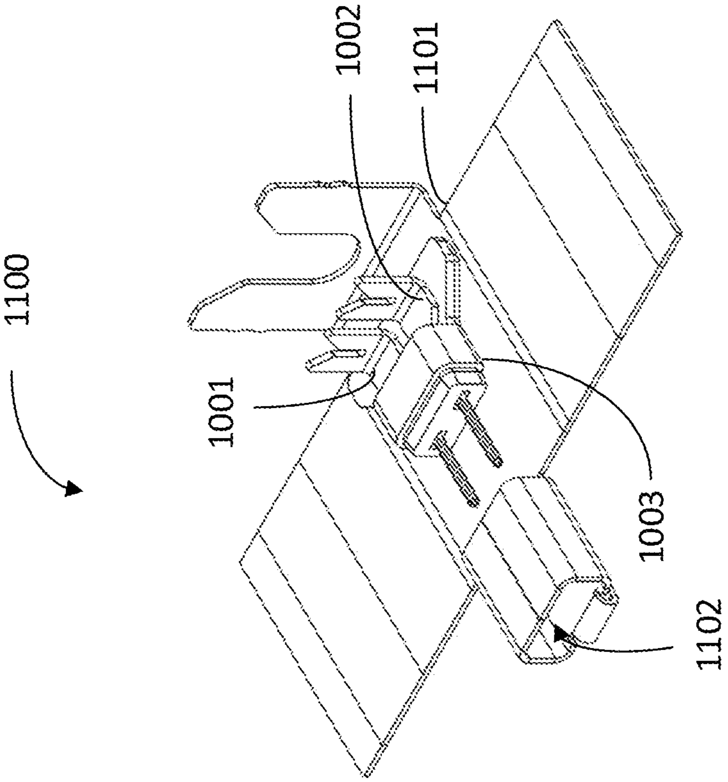

FIGS. 11A and 11B are assembly views 1100 and 1150 of the male connector in accordance with an illustrative embodiment. FIG. 11A is an assembly view 1100 of the first and second IDC contacts 1001 and 1002 seated within the first insulative housing 1003 and an outer shield 1101 of the male connector. That is, the first IDC contact 1001 was inserted into the first IDC contact retention opening such that the pin of the first IDC contact 1001 extends outwardly from a first side of the first IDC contact retention opening and the IDC portion of the first IDC contact 1001 extends from a side opposite the first side. The second IDC contact 1002 was similarly inserted to the second IDC contact retention opening. The contact retention openings may be formed of a material that creates a frictional force between the IDC contacts and thereby reliably retain the IDC contacts therein.

FIG. 11B is an assembly view 1150 of the first and second IDC contacts 1001 and 1002 seated within the first insulative housing 1003 and positioned within the first cage structure 1102 of the outer shield 1101 of the male connector. That is, the first insulative housing 1003 is positioned within the first cage-like structure 1102 of the outer shield such that the pin portions of the first and second IDC contacts 1001 and 1002 are positioned within the first cage like structure.

Figure 11D:
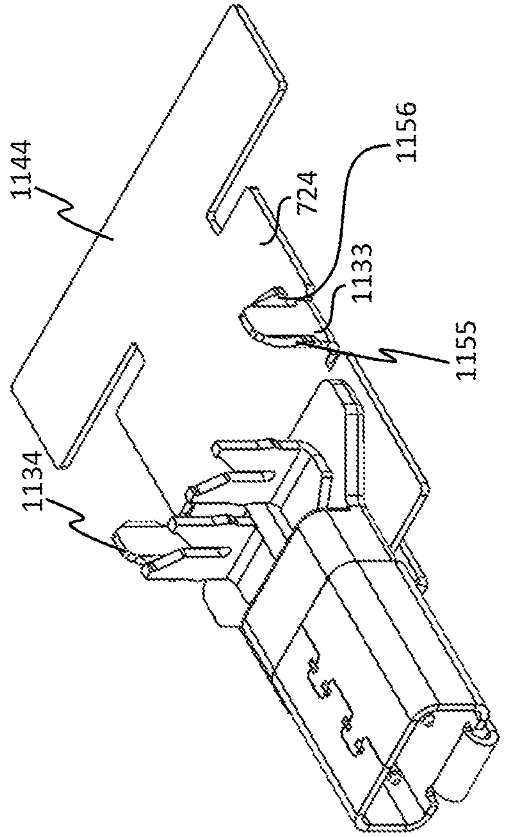
FIGS. 11C and 11D are assembly views of the male connector in accordance with another illustrative embodiment.
Figure 11C:
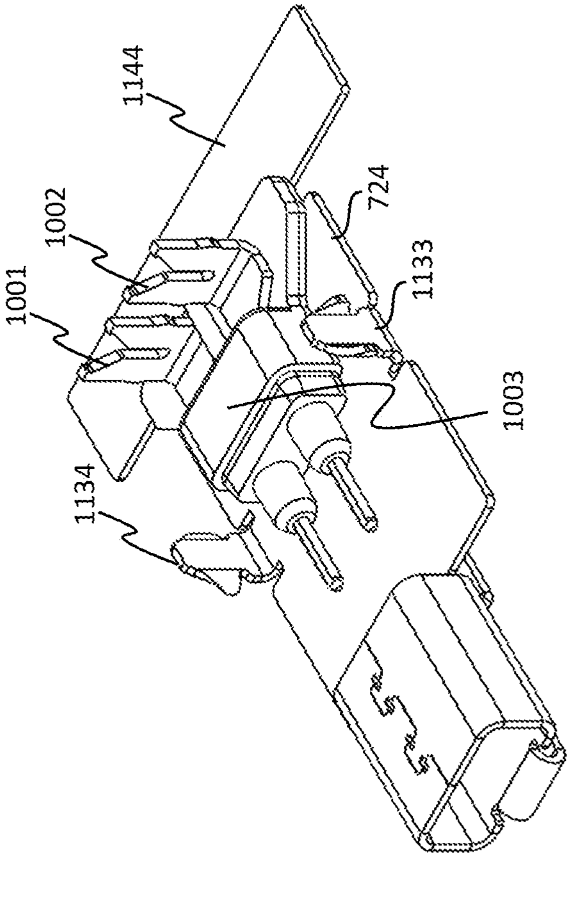

FIGS. 11C and 11D are assembly views of the male connector in accordance with another illustrative embodiment such as that depicted in FIG. 7B. The male connector of FIGS. 11C and 11D includes various similar features as the male connector of FIGS. 11A and 11B as will be evident from the figures but also includes additional or different features as discussed below. FIG. 11C is an assembly view of the first and second IDC contacts 1001 and 1002 seated within the first insulative housing 1003 and an inner shield portion 724 of the male connector. That is, the first IDC contact 1001 was inserted into the first IDC contact retention opening such that the pin of the first IDC contact 1001 extends outwardly from a first side of the first IDC contact retention opening and the IDC portion of the first IDC contact 1001 extends from a side opposite the first side. The second IDC contact 1002 was similarly inserted to the second IDC contact retention opening. The contact retention openings may be formed of a material that creates a frictional force between the IDC contacts and thereby reliably retain the IDC contacts therein. The inner shield portion 724 further includes a crimp portion 1144 that is configured to be crimped around a cable that is connected to the male connector. The crimp portion 1144 is wider than a main body portion of the inner shield portion 724 such that it can be crimped around at least a significant portion of a circumference of the cable.

FIG. 11D is an assembly view of the first and second IDC contacts 1001 and 1002 seated within the first insulative housing 1003 and positioned within a first cage structure of the inner shield portion 724 of the male connector. That is, the first insulative housing 1003 is positioned within the first cage-like structure 1102 of the outer shield such that the pin portions of the first and second IDC contacts 1001 and 1002 are positioned within the first cage like structure. As depicted in FIGS. 11C and 11D, inner shield portion 724 includes retention clips 1133 and 1134 that extend substantially perpendicular to a base of the inner shield portion 724. The retention clips 1133 and 1134 are configured to engage recessed 955 and 975, respectively (see FIGS. 9C and 9D) of the insulative housing 901. In addition, the retention clips 1133 and 1134 each have wings 1155 and 1156 that extend on either side of a main body portion of the retention clip to selectively engage a window of the outer shield portion 726 (see, e.g., FIG. 7B) and thereby mechanically connected the inner shield portion 724 to the outer shield portion 726.

Figure 12A:
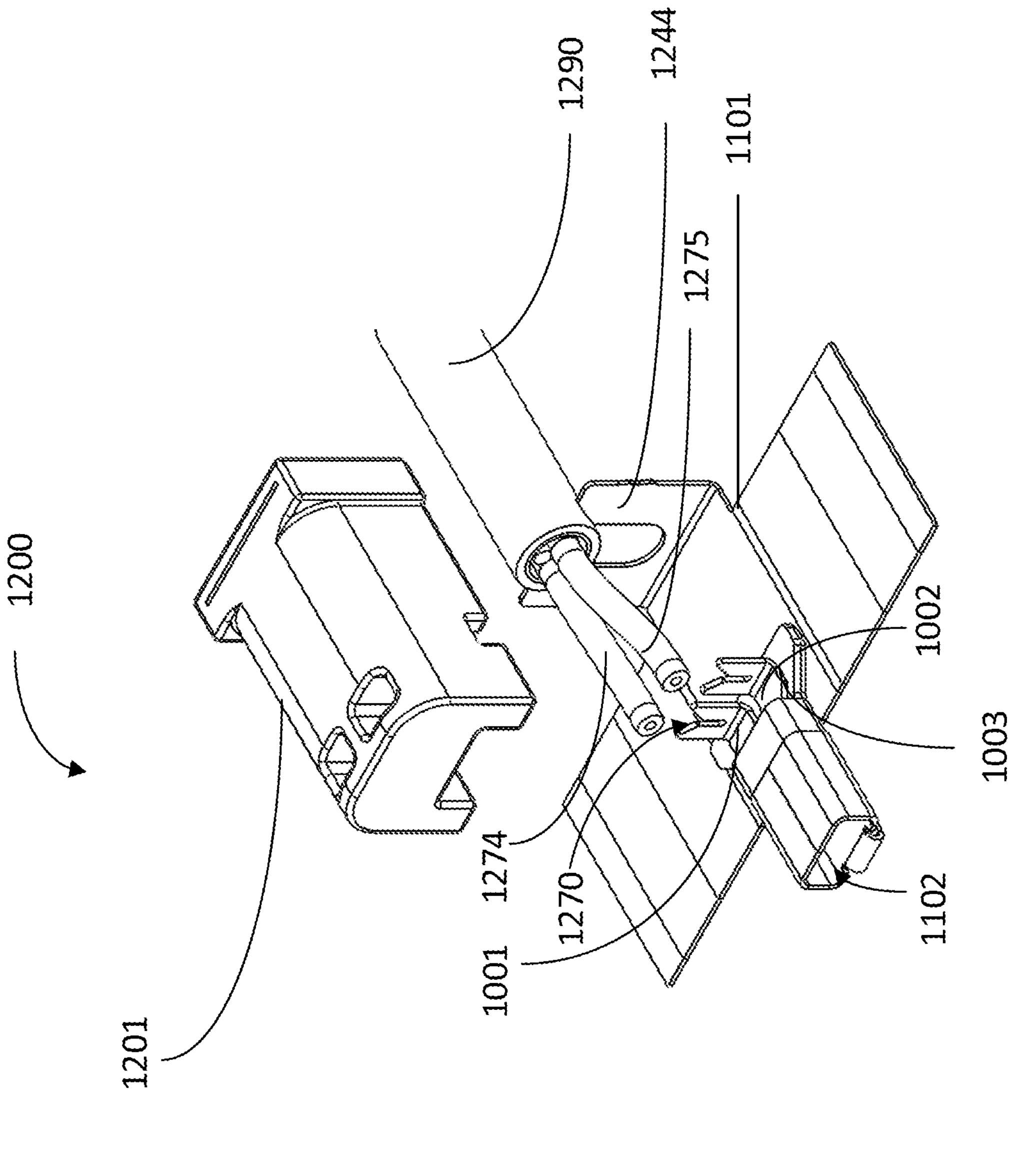
FIG. 12A is an assembly view of the male connector in accordance with an illustrative embodiment.

FIG. 12A is an assembly view 1200 of a male connector in accordance with an illustrative embodiment. More particularly, the assembly view 1200 depicts the first and second IDC contacts 1001 and 1002 seated within the first insulative housing 1003 and positioned within the first cage structure 1102 of the outer shield 1101, and a second insulative housing 1201. The second insulative housing 1201 is similar to the insulative housing 901 described in reference to FIG. 9A. The SPE cable 1290 is positioned over a wire retention portion 1244 of the outer shield 1101. The first wire 1274 of the SPE cable is positioned over the IDC portion 1270 of the first IDC contact 1001 and the second wire 1275 of the SPE cable 1290 is positioned over the IDC portion 1270 of the second IDC contact 1002. Moreover, the second insulative housing 1201 is positioned to be compressed onto the IDC contacts and the wire retention portions.

Figure 12B:
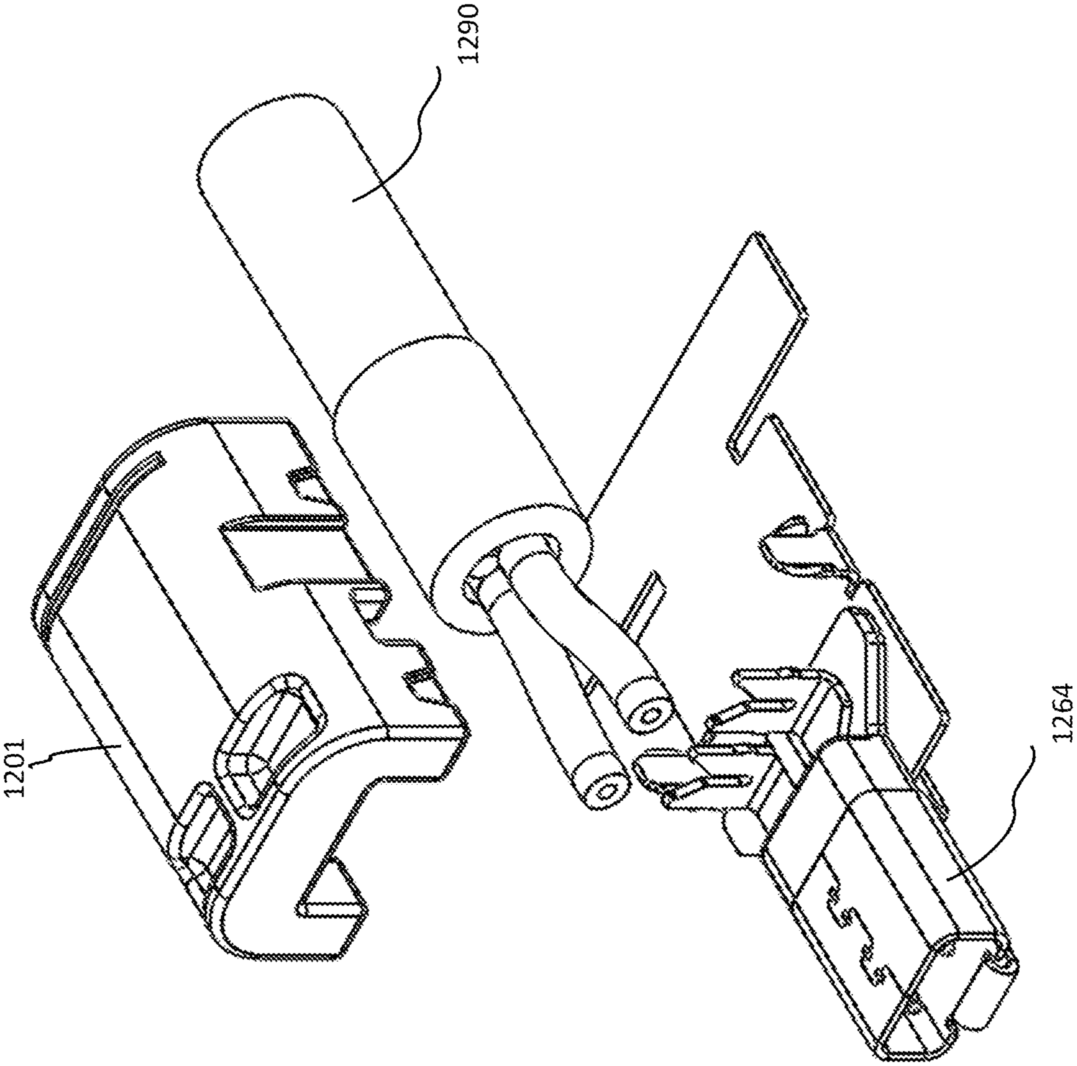
FIG. 12B is an assembly view of the male connector in accordance with another illustrative embodiment.

FIG. 12B is an assembly view of a male connector as shown in FIGS. 11C and 11D in accordance with another illustrative embodiment. The male connector of FIG. 12B includes various similar features as the male connector of FIG. 12A as will be evident from the figures but also includes additional or different features as discussed below. More particularly, FIG. 12B depicts the first and second IDC contacts 1001 and 1002 seated within the first insulative housing 1003 and positioned within a first portion 1264 of the outer shield. FIG. 12B further depicts a second insulative housing 1201. The second insulative housing 1201 is similar to the insulative housing 901 described in reference to FIG. 9B. The SPE cable 1290 is positioned over a crimp portion of the outer shield. A first wire of the SPE cable is positioned over the IDC portion of the first IDC contact 1001 and a second wire of the SPE cable 1290 is positioned over the IDC portion 1270 of the second IDC contact 1002. Moreover, the second insulative housing 1201 is positioned to be compressed onto the IDC contacts.

Figure 13B:
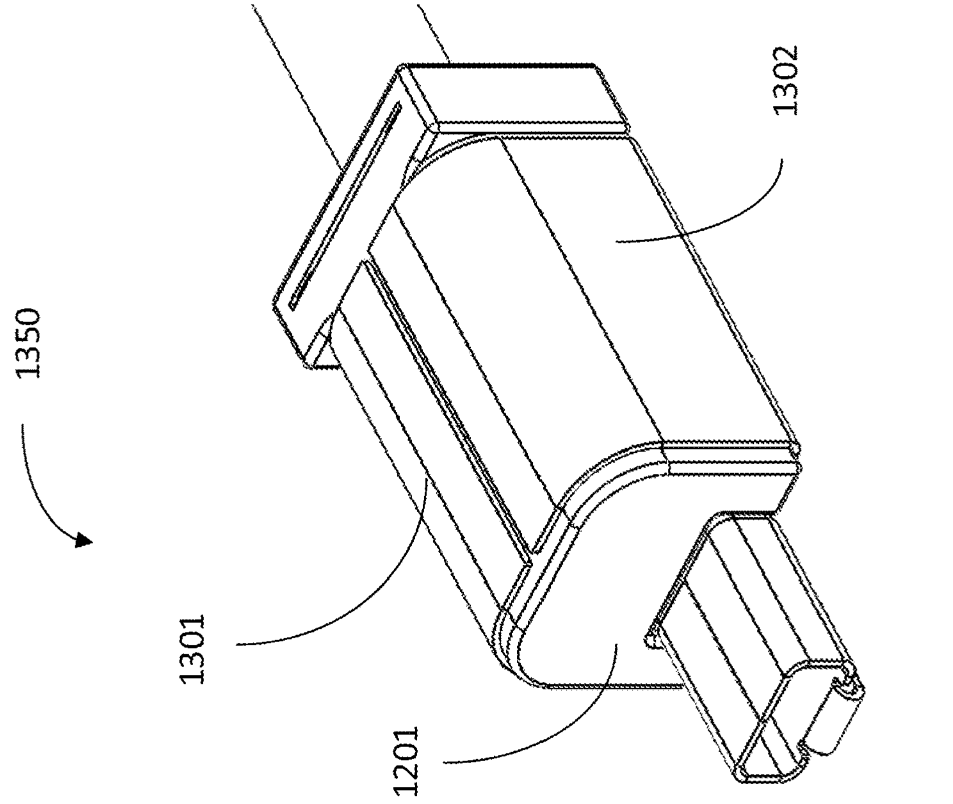
FIGS. 13A and 13B are assembly views of the male connector in accordance with an illustrative embodiment.
Figure 13A:
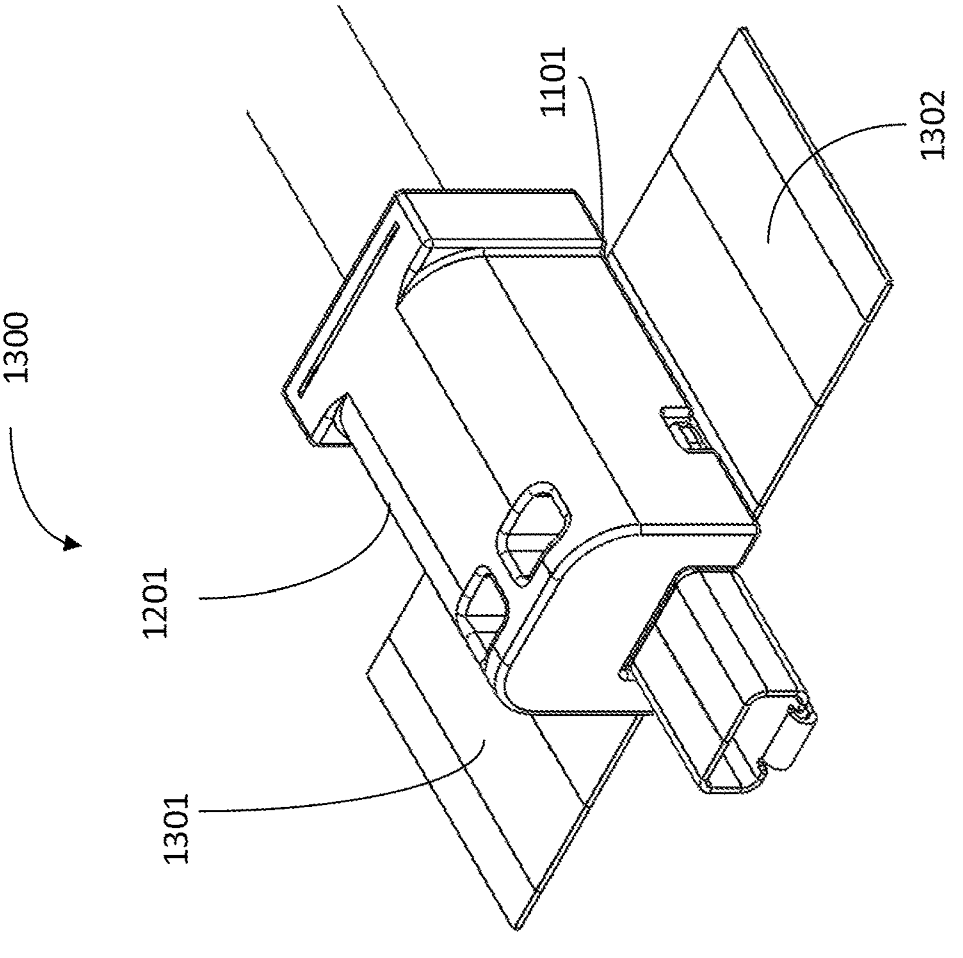

FIGS. 13A and 13B depict assembly views 1300 and 1350 of the male connector in accordance with an illustrative embodiment. More particularly, FIG. 13A is an assembly view 1300 of the second insulative housing 1201 positioned within the outer shield 1101. That is, the second insulative housing 1201 was compressed downwardly onto the IDC contacts such that the IDC portion of the IDC contacts caused the insulation of the respective wires to be displaced thereby forming an electrical and mechanical connection therebetween. Moreover, the compression of the second insulative housing 1201 caused the SPE cable to be compressed into the wire retention portion thereby forming a mechanical connection between the male connector and the SPE cable via a frictional force.

FIG. 13B is an assembly view 1350 of the outer shield 1101 mechanically secured with the insulative housing 1201. A first portion 1301 and a second portion 1302 of the outer shield 1101 were adjusted to wrap the second insulative housing 1201. The adjustment of the first and second portion of the outer shield mechanically secures the second insulative housing 1201 with the outer shield 1101. Additionally, in this position, the outer shield 1101 provides a maximum amount of electromagnetic shield, which reduces the potential of RF interference and ensures quality and integrity of the electrical connections.

Figure 13D:
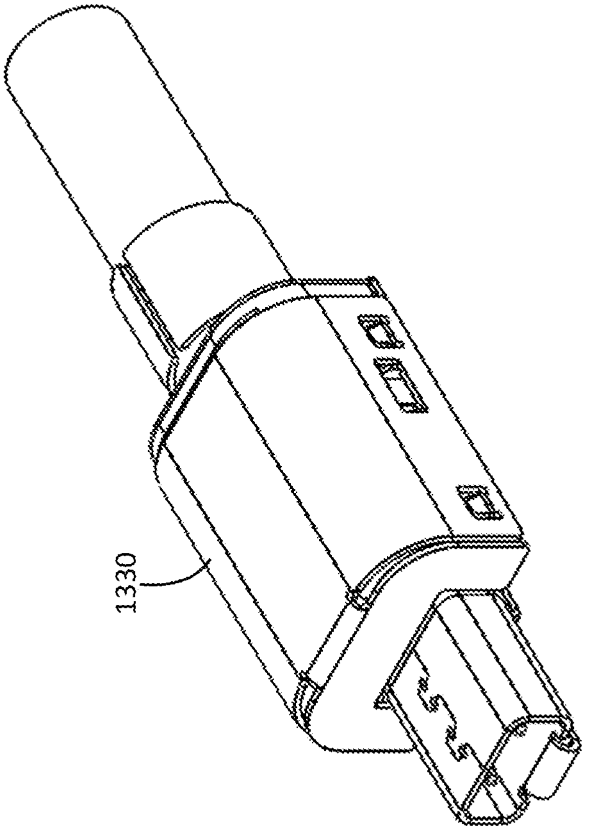
FIGS. 13C and 13D are assembly views of the male connector in accordance with another illustrative embodiment.
Figure 13C:
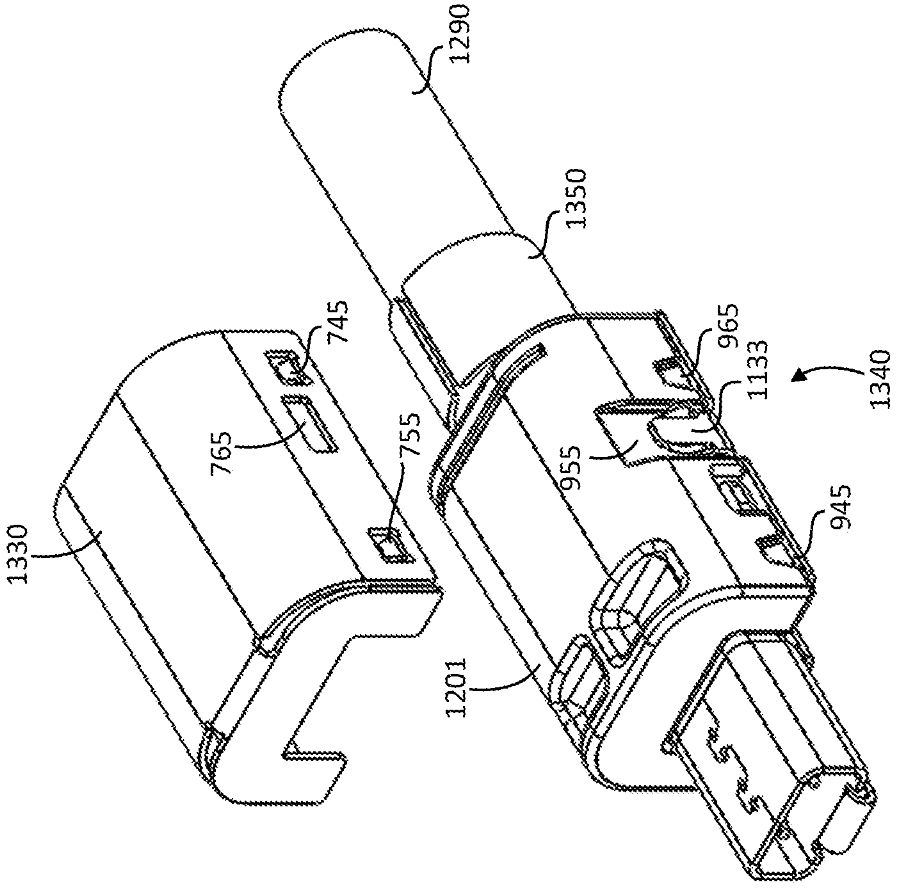

FIGS. 13C and 13D depict assembly views of the male connector of FIGS. 11C and 11D in accordance with an illustrative embodiment. The male connector of FIGS. 13C and 13D includes various similar features as the male connector of FIGS. 13A and 13B as will be evident from the figures but also includes additional or different features as discussed below. More particularly, FIG. 13C depicts the second insulative housing 1201 positioned between an upper portion 1330 and a lower portion 1340 of the outer shield. That is, the second insulative housing 1201 was compressed onto the IDC contacts such that the IDC portion of the IDC contacts caused the insulation of the respective wires to be displaced thereby forming an electrical and mechanical connection therebetween. FIG. 13C further depicts a crimped portion 1350 of the outer shield crimped about the cable 1290. FIG. 13D depicts the assembled connector in which the upper portion 1330 of the outer shield is mechanically secured with the insulative housing 1201.

Figure 14:
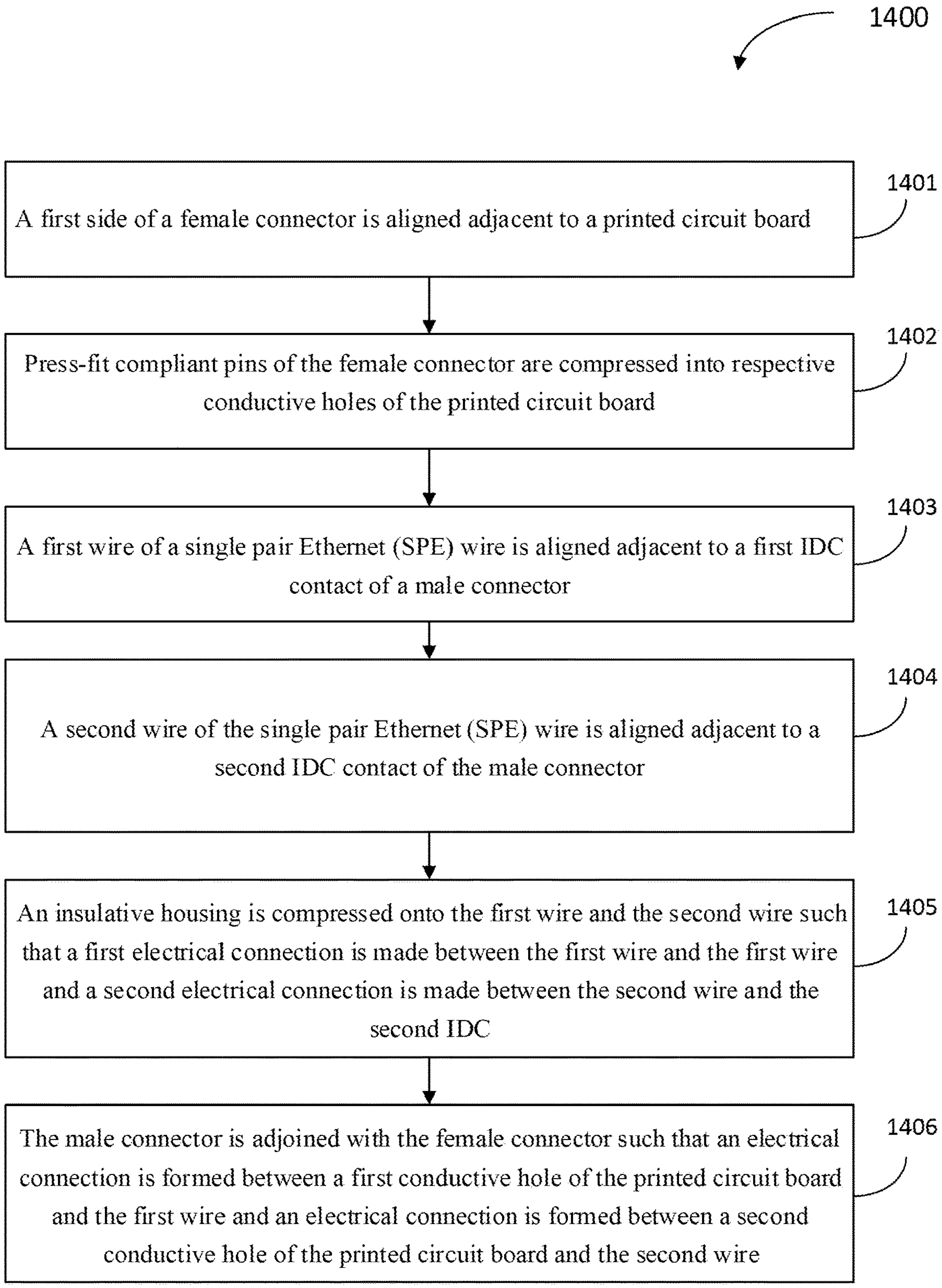
FIG. 14 depicts a flow diagram of a method of use (assembly) of the SPE connector in accordance with an illustrative embodiment.

FIG. 14 depicts a flow diagram of a method 1400 of use of a SPE connector in accordance with an illustrative embodiment. The method 1400 also describes a method of assembling the SPE connector such that an electrical connection between a PCB and SPE cable is formed.

In an operation 1401, a first side of a female connector is aligned adjacent to a printed circuit board. In an embodiment, the female connector is aligned adjacent to the PCB such that press-fit compliant pins are aligned with respective holes and one or more latching pins are aligned with respective through-holes on the PCB. In alternative embodiments, the connector may utilize contact pins that create an interference fit with a contact pin on the PCB such that press-fit compliant pins are not utilized. In some embodiments, an insulative housing having contacts therein may first be placed into an outer shield of the female contact and an end portion may be hinged or folded into a close position such that the outer shield is mechanically secured to the insulative housing of the female connector.

In an operation 1402, press-fit compliant pins of the female connector are compressed into respective conductive holes of the printed circuit board. The female connector is compressed together with the PCB such that the press-fit compliant pins deform and reform in order to lock into the respective conductive holes. Similarly, the latching pins may deform, reform, and lock into respective through-holes. The latching pins and the press-fit pins create a reliable mechanical connection between the female connector and the PCB. In an alternative embodiment where press-fit compliant pins are not used, the pins of the female connector are compressed against contact pads on the PCT. This operation may be performed in conjunction with compressing of the insulating housing or other components onto the PCB.

In an operation 1403, a first wire of a single pair Ethernet (SPE) cable is aligned adjacent to a first IDC contact of a male connector. In an operation 1404, a second wire of the single pair Ethernet (SPE) cable is aligned adjacent to a second IDC contact of the male connector. In an embodiment, the first and second wires are positioned over blades of the respective IDC contacts such that when the wires are compressed together with the IDC, the wires are compressed between the blades. Moreover, the SPE cable may be positioned adjacent to a wire retention portion of the male connector such that when the SPE cable is compressed together with the wire retention portion, the retention portions causes the male connector to mechanically secure to the SPE cable via a frictional force. In alternative embodiments, a crimp portion of an outer shield may be used in lieu of the wire retention portion and the crimp portion may be crimped about at least a portion of the SPE cable.

In an operation 1405, an insulative housing is compressed onto the first wire and the second wire such that a first electrical connection is made between the first wire and the first wire and a second electrical connection is made between the second wire and the second IDC. In an embodiment, the insulative housing is positioned adjacent to the IDC contacts and the first and second wire and compressed onto the IDC contacts and the first and second wires such that the first and second wires are forced into respective blades of the IDC contacts, thereby causing the insulation of the first and second wires to displace and an electrical and mechanical connection to form therebetween. Moreover, the SPE cable may be forced, via the compression of the insulative housing, into the wire retention portion such that a second point of mechanical connection between the SPE cable and the male connector is formed via a frictional force.

Moreover, in an embodiment, once the insulative housing is compressed onto the IDC contacts, the insulative housing may be mechanically secured to an outer shield of male connector such that the insulative housing and the IDC contacts are at least partially encapsulated within the outer shield. For example, the insulated housing may be compressed onto the IDC contacts that are positioned on a base portion of the outer shield. A first portion (e.g., a first wing) of the outer shield may then be folded up and/or around the insulative housing and a second portion (e.g., a second wing) may be folded up and/or around the insulative housing such that the insulative housing and IDC contacts are mechanically secured therein. In some embodiments, the first portion and the second portion are made from a flexible material that can be deformed in order to wrap around the insulative housing. In this configuration, the insulative housing is mechanically secured to the outer shield at least by the wire retention portion, the base portion, the first portion, and the second portion of the outer shield. The encapsulation by the outer shield provides RF protection to the contacts positioned therein to ensure the integrity of any electrical signals carried by the IDC contacts.

In an operation 1406, the male connector is adjoined with the female connector such that an electrical connection is formed between a first conductive hole of the printed circuit board and the first wire and an electrical connection is formed between a second conductive hole of the printed circuit board and the second wire. In an embodiment, the male connector is positioned adjacent to the female connector such that pins of the male connector are aligned with an opening of the recesses of the female connector. The male connector is compressed into the female connector such that an electrical and mechanical connection of contacts of the male connector is formed with respective contacts in the female connector. In some embodiments, a latching pin of the male connector may mate with an opening on the female connector in order to mechanically secure the male connector with the female connector.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.) It will be further understood by those skilled in the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.) In instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.) It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A solderless single pair Ethernet (SPE) connector assembly comprising:

- a female connector portion comprising:
  - a first electrical contact comprising a first pin and a first female portion, the first electrical contact positioned partially within a first insulative housing, wherein the first female portion comprises a first contact tine extending within a first recess of the first insulative housing such that a first pinch-point is formed between the first contact tine and the first insulative housing;
  - a second electrical contact comprising a second pin and a second female portion, the second electrical contact positioned partially within the first insulative housing; and
  - a first outer shield, the first outer shield mechanically secured to the first insulative housing; and
- a male connector portion comprising:
  - a third electrical contact comprising a first insulation displacement contact (IDC) portion and a first male portion;
  - a fourth electrical contact comprising a second IDC portion and a second male portion; and
  - a second outer shield, the second outer shield mechanically secured to a second insulative housing, the second insulative housing positioned at least partially around the third electrical contact and the fourth electrical contact.

2. The solderless SPE connector assembly of claim 1, wherein the first pin comprises a first press-fit pin and the second pin comprises a second press-fit pin, wherein the first press-fit pin extends from a first recess of the first insulative housing past the first outer shield and the second press-fit pin extends from a second recess of the first insulative housing past the first outer shield.

3. The solderless SPE connector assembly of claim 2, wherein the first press-fit pin and the second press-fit pin extend in a parallel direction from the first insulative housing.

4. The solderless SPE connector assembly of claim 1, wherein the first contact tine further comprises a first curvature near a distal end of the first contact tine such that the first pinch-point is formed between the first curvature of the first contact tine and the first insulative housing.

5. The solderless SPE connector assembly of claim 4, wherein the first male portion comprises a pin structured to extend in the first pinch-point when the male connector portion and the female connector portion are adjoined such that an electrical connection is formed therebetween.

6. The solderless SPE connector assembly of claim 1, further comprising a second outer shield comprising a first cage structure and a second cage structure, the first cage structure configured to be positioned at least partially within the first outer shield.

7. The solderless SPE connector assembly of claim 6, wherein the first IDC portion and the second IDC portion are positioned within the second cage structure.

8. The solderless SPE connector assembly of claim 6, the second cage structure comprising a first flexible portion, a base portion, a second flexible portion, and a wire retention portion.

9. The solderless SPE connector assembly of claim 8, wherein the wire retention portion is at least partially positioned within a recess of the second insulative housing.

10. The solderless SPE connector assembly of claim 1, the female connector portion connected to the male connector portion such that the first female portion of the first contact is electrically connected to the first male portion of the third contact.

11. The solderless SPE connector assembly of claim 10, wherein the second female portion of the second electrical contact is electrically connected to the second male portion of the fourth electrical contact.

12. The solderless SPE connector assembly of claim 10, wherein the first outer shield and the second outer shield are comprised of a conductive configured to provide radio-frequency (RF) shielding to the first electrical contact, the second electrical contact, the third electrical contact, and the fourth electrical contact.

13. The solderless SPE connector assembly of claim 1, wherein the first IDC portion comprises a first and a second blade that extend along a first plane perpendicular to a second plane in which the first male portion extends, and wherein the first pin extends along a third plane, and wherein the third plane is parallel to the first plane.

14. A solderless wire-to-board single pair Ethernet (SPE) connector assembly comprising:

- a female connector portion comprising:
  - a first contact comprising a first pin and a first female portion,
  - a second contact comprising a second pin and a second female portion, and
  - a first insulative housing, wherein the first female portion comprises a first contact tine extending within a first recess of the first insulative housing such that a first pinch-point is formed between the first contact tine and the first insulative housing, and wherein the first insulative housing comprises a first contact retention recess and a second contact retention recess; the first contact positioned at least partially within the first contact retention recess, and the second contact positioned at least partially within the second contact retention recess;
  - wherein the first pin and the second pin extend from the first insulative housing and are configured to electrically connect to respective contacts of a printed circuit board; and
- a male connector portion comprising a first insulation displacement contact (IDC) and a second IDC, the first IDC configured to connect to a first wire of an SPE cable, and the second IDC configured to connect to a second wire of the SPE cable.

15. The solderless wire-to-board SPE connector assembly of claim 14, wherein the male connector portion comprises an outer shield including an upper shield portion mechanically coupled to a lower shield portion by one or more retention features.

16. The solderless wire-to-board SPE connector assembly of claim 14, wherein the first contact is configured to connect with the first IDC, and wherein the second contact is configured to connect with the second IDC.

17. The solderless wire-to-board SPE connector assembly of claim 14, the female connector portion further comprising an outer shield mechanically secured to the first insulative housing, the outer shield comprising latching pins configured to mechanically secure the outer shield to the printed circuit board.

18. The solderless wire-to-board SPE connector assembly of claim 14, the first insulative housing further comprising a saddle seat portion within the first contact retention recess.

19. A method for assembling a connector assembly, comprising:

- aligning a first side of a female connector adjacent to a printed circuit board;
- compressing pins of the female connector against conductive portions of the printed circuit board;
- aligning a first female portion of a first electrical contact in a first recess of a first insulative housing of the female connector, where the first female portion comprises a first contact tine extending within the first recess of the first insulative housing such that a first pinch-point is formed between the first contact tine and the first insulative housing;
- aligning a first wire of a single pair Ethernet (SPE) wire adjacent to a first IDC contact of a male connector;
- aligning a second wire of the single pair Ethernet (SPE) wire adjacent to a second IDC contact of the male connector;
- compressing an insulative housing onto the first wire and the second wire such that a first electrical connection is made between the first wire and the first IDC and a second electrical connection is made between the second wire and the second IDC;
- securing the female connector to the PCB via one or more matching pins; and
- adjoining the male connector with the female connector such that an electrical connection is formed between a first conductive portion of the printed circuit board and the first wire and an electrical connection is formed between a second conductive portion of the printed circuit board and the second wire.

20. The solderless SPE connector assembly of claim 1, wherein the first outer shield comprises an end portion connected to a main body portion by a transition portion, and wherein the transition portion is folded to position the end portion perpendicular to the main body portion of the first outer shield.

21. The solderless SPE connector assembly of claim 1, wherein the first outer shield comprises a first arm extending in a U shape from an edge of a first side of the first outer shield to a first latching pin, wherein the end portion of the first outer shield comprises an extension portion extending from the end portion around the main body portion of the first outer shield, and wherein the extension portion further comprises a second latching pin extending perpendicularly from the extension portion.

* * * * *